US011604464B2

(12) United States Patent
Walsh

(10) Patent No.: US 11,604,464 B2
(45) Date of Patent: Mar. 14, 2023

(54) VIRTUAL VALET

(71) Applicant: HERE Global B.V., Eindhoven (NL)

(72) Inventor: Vincent Walsh, Evanston, IL (US)

(73) Assignee: HERE Global B.V., Eindhoven (NL)

( * ) Notice: Subject to any disclaimer, the term of this patent is extended or adjusted under 35 U.S.C. 154(b) by 341 days.

(21) Appl. No.: 16/174,444

(22) Filed: Oct. 30, 2018

(65) Prior Publication Data

US 2020/0133268 A1 Apr. 30, 2020

(51) Int. Cl.
*G05D 1/00* (2006.01)
*B60W 30/06* (2006.01)
*G01C 21/36* (2006.01)
*B60W 50/10* (2012.01)

(52) U.S. Cl.
CPC .......... *G05D 1/0088* (2013.01); *B60W 30/06* (2013.01); *B60W 50/10* (2013.01); *G01C 21/3664* (2013.01); *G05D 2201/0213* (2013.01)

(58) Field of Classification Search
CPC .... B60W 30/06; B60W 50/10; B60W 30/182; B60W 10/06; G05D 1/0088; G05D 2201/0213; G01C 21/3664; G01C 21/3461; G01C 21/3492
See application file for complete search history.

(56) References Cited

U.S. PATENT DOCUMENTS

| | | | |
|---|---|---|---|
| 7,174,153 B2* | 2/2007 | Ehlers | G08G 1/096811 |
| | | | 701/515 |
| 9,547,985 B2 | 1/2017 | Tuukkanen | |
| 9,721,472 B2 | 8/2017 | Jain et al. | |
| 2014/0129142 A1* | 5/2014 | Kantarjiev | G01C 21/3492 |
| | | | 701/533 |
| 2015/0248131 A1 | 9/2015 | Fairfield et al. | |
| 2017/0147959 A1 | 5/2017 | Sweeney et al. | |

(Continued)

FOREIGN PATENT DOCUMENTS

WO WO2017150465 * 9/2017

OTHER PUBLICATIONS

Autonomous Vehicles I Self-Driving Vehicles Enacted Legislation [online] [retrieved Sep. 11, 2019]. Retrieved from the Internet: https://web.archive.org/web/20181013163104/http://www.ncsl.org/research/transportation/autonomous-vehicles-self-driving-vehicles-enacted-legislation.aspx. (Oct. 13, 2018) 16 pages.

*Primary Examiner* — Gertrude Arthur Jeanglaude
(74) *Attorney, Agent, or Firm* — Alston & Bird LLP

(57) ABSTRACT

A vehicle apparatus onboard a vehicle identifies a human operator-free trip trigger corresponding to a human operator-free trip the vehicle is to take. The vehicle is located at an origin location of the human operator-free trip. Responsive to the vehicle apparatus identifying the human operator-free trip trigger, a candidate destination location for the human operator-free trip is identified. A candidate route from the origin location to the candidate destination location is generated. The vehicle apparatus provides a trip request including the candidate route to an approval apparatus. The vehicle apparatus receives a message from the approval apparatus. Responsive to determining that the message comprises an approval of the candidate route, the vehicle apparatus controls one or more systems of the vehicle to cause the vehicle to traverse the candidate route from the origin location to the candidate destination location.

20 Claims, 7 Drawing Sheets

(56) References Cited

U.S. PATENT DOCUMENTS

| | | | |
|---|---|---|---|
| 2018/0136658 A1* | 5/2018 | Huai | G05D 1/0214 |
| 2018/0137593 A1* | 5/2018 | Djuric | G06Q 50/30 |
| 2018/0173219 A1* | 6/2018 | Lee | G01C 21/3492 |
| 2018/0202822 A1 | 7/2018 | DeLizio | |
| 2018/0209801 A1* | 7/2018 | Stentz | B60W 60/0011 |
| 2019/0054919 A1* | 2/2019 | Noto | G05D 1/0061 |
| 2019/0172170 A1* | 6/2019 | Jabour | G06Q 30/0645 |
| 2019/0184959 A1* | 6/2019 | Cao | G06K 9/00362 |
| 2019/0391587 A1* | 12/2019 | Uvarov | G06K 9/4628 |

* cited by examiner

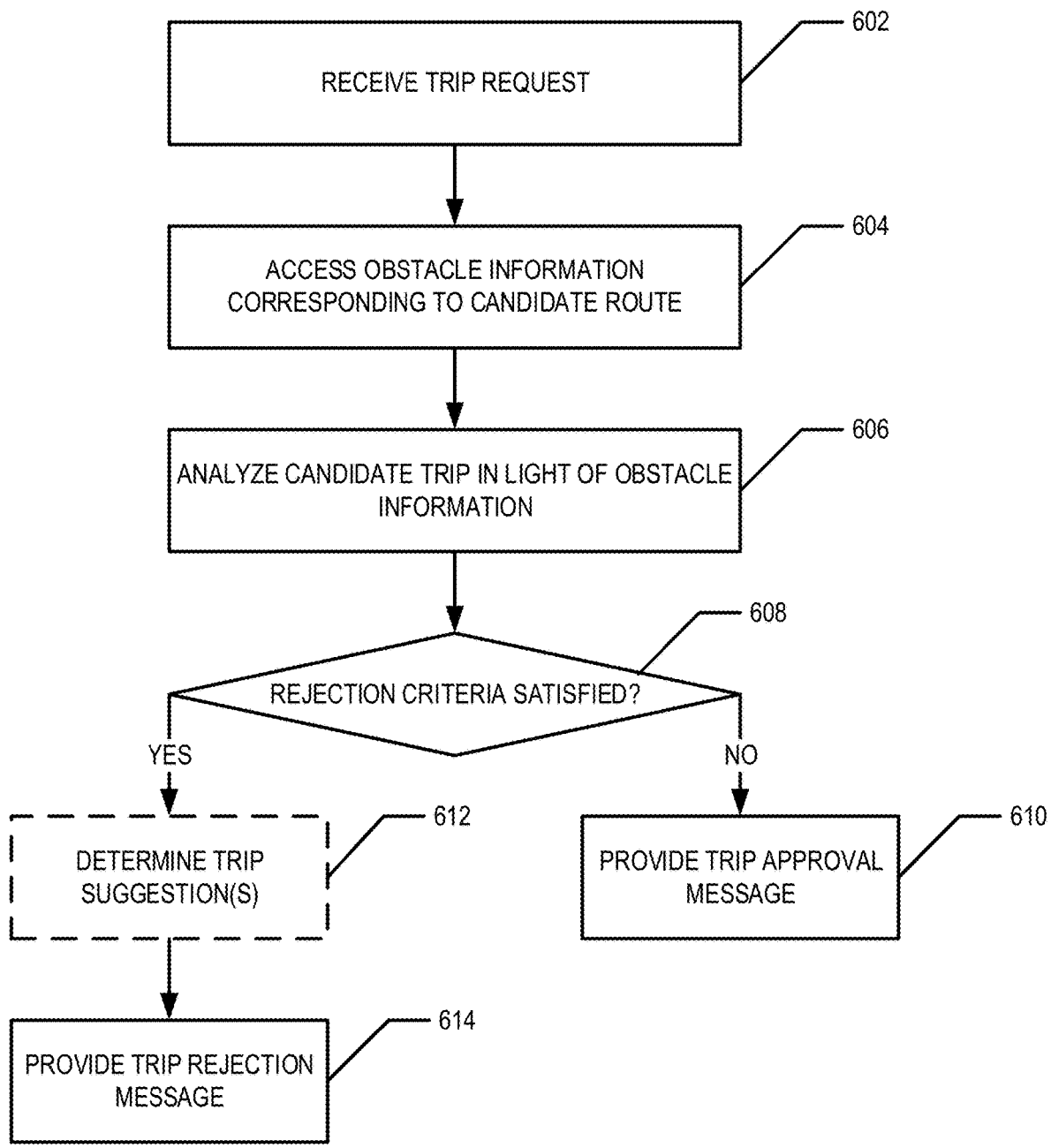

VIRTUAL VALET

TECHNOLOGICAL FIELD

An example embodiment relates generally to autonomous self-driving vehicles. An example embodiment relates generally to autonomous self-driving vehicles taking human operator-free trips.

BACKGROUND

Ideally passengers of an autonomous, self-driving vehicle could enter/exit the vehicle exactly at their destination instead of a place where the vehicle needs to be kept (restaurant entrance vs. parking lot). However, the places where passengers want to be dropped off would often leave the autonomous, self-driving vehicle in the way of other vehicles or pedestrians. Thus, a virtual valet would require that the autonomous, self-driving vehicle maneuver from the pick-up/drop-off location to another destination and/or a vehicle storage area (e.g., a parking lot/deck). However, such virtual valet service would require that the autonomous, self-driving vehicle conduct a human operator-free trip (e.g., a trip where no people are within the vehicle).

BRIEF SUMMARY OF SOME EXAMPLE EMBODIMENTS

Various embodiments provide methods, systems, apparatuses, and computer program products for an autonomous, self-driving car to take a human operator-free trip. For example, embodiments of the present invention provide for a vehicle to be controlled by a vehicle apparatus to take a trip from an origin location to a destination location with no people onboard the vehicle. In various embodiments, a human operator-free trip may be a trip in which there are no humans in the vehicle or there are no humans onboard the vehicle that are capable of taking control and/or allowed to take control of the vehicle (e.g., there's a human in the back seat, the human on onboard is intoxicated, the human onboard is a minor and/or is not licensed to operate a vehicle, the human onboard is not authorized to control the vehicle, and/or the like). In an example embodiment, responsive to identifying a human operator-free trip trigger, the vehicle apparatus determines a candidate trip from the origin location to a candidate destination location. A trip request comprising the candidate trip is provided to an approval apparatus. The approval apparatus reviews the trip request in light of obstacle information/data to determine if the candidate trip satisfies one or more rejection criteria. If the candidate trip does not satisfy one or more rejection criteria, the candidate trip is approved and the approval apparatus provides an approval message to the vehicle apparatus. If the candidate trip does satisfy one or more rejection criteria, the candidate trip is not approved and the approval apparatus provides a rejection message to the vehicle apparatus. In an example embodiment, the rejection message comprises one or more trip suggestions. Responsive to receiving a rejection message, the vehicle apparatus may submit a revised trip request.

Responsive to receiving the approval message, the vehicle apparatus controls the vehicle to take the human operator-free trip corresponding to the approved candidate trip. In various embodiments, the vehicle apparatus may cause the vehicle to operate in a zero passenger mode while the vehicle is taking the human operator-free trip. In an example embodiment, when the vehicle operates in zero passenger mode, all of the sensors onboard the vehicle are active and the sensor information/data captured thereby is stored by the vehicle apparatus and/or by other computer-readable memory onboard the vehicle and/or the sensor information/data is provided (e.g., transmitted) to a remote apparatus for storage. Once the vehicle reaches the destination location, the human operator-free trip is complete and the vehicle waits to identify another human operator-free trip trigger or for one or more authorized passengers to enter the vehicle.

In an example embodiment, a human operator-free trip trigger is identified by a vehicle apparatus onboard a vehicle. The vehicle is located at an origin location. Responsive to identifying the human operator-free trip trigger, a candidate destination location for a human operator-free trip is identified. A candidate route from the origin location to the candidate destination location is generated. A trip request comprising the candidate route is provided to an approval apparatus by the vehicle apparatus. The vehicle apparatus receives a message from the approval apparatus. Responsive to determining that the message comprises an approval of the candidate route, the vehicle apparatus controls one or more systems of the vehicle to cause the vehicle to traverse the candidate route from the origin location to the candidate destination location.

In accordance with an aspect of the present invention, a method for an autonomous self-driving vehicle to take a human operator-free trip is provided. In an example embodiment, the method comprises identifying a human operator-free trip trigger by a vehicle apparatus onboard a vehicle. The human operator-free trip trigger indicates that the vehicle is to take a human operator-free trip. The vehicle is located at an origin location of the human operator-free trip. The method further comprises responsive to identifying the human operator-free trip trigger, identifying a candidate destination location for a human operator-free trip and generating a candidate route from the origin location to the candidate destination location. The method further comprises providing, by the vehicle apparatus, a trip request comprising the candidate route to an approval apparatus; and receiving, by the vehicle apparatus, a message from the approval apparatus in response to the trip request. The method further comprises, responsive to determining that the message comprises an approval of the candidate route, controlling, by the vehicle apparatus, one or more systems of the vehicle to cause the vehicle to traverse the candidate route from the origin location to the candidate destination location.

In an example embodiment, the method further comprises, responsive to determining that the message comprises a rejection of the candidate route, determining a revised candidate route and providing a revised trip request to the approval apparatus. In an example embodiment, the revised candidate route is from the origin location to a revised candidate destination location. In an example embodiment, the message comprises one or more route suggestions and the revised candidate route is determined at least in part based on at least one of the one or more route suggestions. In an example embodiment, (a) the vehicle apparatus does not begin the human operator-free trip until the vehicle apparatus determines that a message indicating approval of a candidate route or revised candidate route is received and (b) the vehicle apparatus controls the vehicle to take the human operator-free trip along the approved candidate route or revised candidate route. In an example embodiment, the method further comprises modifying the operation of one or more sensors onboard the vehicle wherein the modified operation of the one or more sensors (a) causes one or more first sensors of the one or more sensors to increase the frequency of data capture, (b) changes at least one capture threshold for at least one second sensor of the one or more sensors, or (c) a combination of causing the one or more first sensors to increase the frequency of data capture and changing at least one capture threshold for at least one second sensor. In an example embodiment, the sensor data captured by the one or more sensors is at least one of (a) stored in computer-readable memory onboard the vehicle or (b) provided to a remote computing apparatus for storage. In an example embodiment, the vehicle apparatus controls the vehicle in a no human override mode as the vehicle traverses the route from the origin location to the candidate destination. In an example embodiment, the candidate destination location is one of a geo-fenced vehicle storage area, a passenger pick-up location, or a location indicated in the human operator-free trip trigger.

According to another aspect of the present invention, an apparatus is provided. In an example embodiment, the apparatus comprises at least one processor, at least one non-transitory memory storing computer program code, at least one communications interface configured to communicate via at least one network, and one or more sensors. The apparatus is onboard a vehicle. The computer program code is configured to, when executed by the at least one processor, cause the apparatus to at least identify a human operator-free trip trigger, wherein the vehicle located at an origin location; responsive to identifying the human operator-free trip trigger, identify a candidate destination location for a human operator-free trip; generate a candidate route from the origin location to the candidate destination location; provide a trip request comprising the candidate route to an approval apparatus; receive a message from the approval apparatus; and responsive to determining that the message comprises an approval of the candidate route, controlling one or more systems of the vehicle to cause the vehicle to traverse the candidate route from the origin location to the candidate destination location.

In an example embodiment, the computer program code is further configured to, when executed by the at least one processor, cause the apparatus to, responsive to determining that the message comprises a rejection of the candidate route, determine a revised candidate route and provide a revised trip request to the approval apparatus. In an example embodiment, the revised candidate route is from the origin location to a revised candidate destination location. In an example embodiment, the message comprises one or more route suggestions and the revised candidate route is determined at least in part based on at least one of the one or more route suggestions. In an example embodiment, (a) the apparatus does not begin the human operator-free trip until the apparatus determines that a message indicating approval of a candidate route or revised candidate route is received and (b) the apparatus controls the vehicle to take the human operator-free trip along the approved candidate route or revised candidate route. In an example embodiment, the computer program code is further configured to, when executed by the at least one processor, cause the apparatus to modify the operation of one or more sensors onboard the vehicle wherein the modified operation of the one or more sensors (a) causes one or more first sensors of the one or more sensors to increase the frequency of data capture, (b) changes at least one capture threshold for at least one second sensor of the one or more sensors, or (c) a combination of causing the one or more first sensors to increase the frequency of data capture and changing at least one capture threshold for at least one second sensor. In an example embodiment, the sensor data captured by the one or more sensors is at least one of (a) stored in computer-readable memory onboard the vehicle or (b) provided to a remote computing apparatus for storage. In an example embodiment, the apparatus controls the vehicle in a no human override mode as the vehicle traverses the route from the origin location to the candidate destination. In an example embodiment, the candidate destination location is one of a pre-defined vehicle storage area, a passenger pick-up location, or a location indicated in the human operator-free trip trigger.

In accordance with still another aspect of the present invention, a computer program product is provided. The computer program product comprises at least one non-transitory computer-readable storage medium having computer-executable program code instructions stored therein. The computer-executable program code instructions comprise program code instructions configured to, when executed by a processor of an apparatus, cause the apparatus to at least identify a human operator-free trip trigger, wherein the apparatus is onboard a vehicle and the vehicle is located at an origin location; responsive to identifying the human operator-free trip trigger, identify a candidate destination location for a human operator-free trip; generate a candidate route from the origin location to the candidate destination location; provide a trip request comprising the candidate route to an approval apparatus; receive a message from the approval apparatus; and responsive to determining that the message comprises an approval of the candidate route, controlling one or more systems of the vehicle to cause the vehicle to traverse the candidate route from the origin location to the candidate destination location.

In an example embodiment, the computer-executable program code instructions further comprise program code instructions configured to, when executed by a processor of an apparatus, cause the apparatus to at least, responsive to determining that the message comprises a rejection of the candidate route, determine a revised candidate route and provide a revised trip request to the approval apparatus. In an example embodiment, the revised candidate route is from the origin location to a revised candidate destination location. In an example embodiment, the message comprises one or more route suggestions and the revised candidate route is determined at least in part based on at least one of the one or more route suggestions. In an example embodiment, (a) the apparatus does not begin the human operator-free trip until the apparatus determines that a message indicating approval of a candidate route or revised candidate route is received and (b) the apparatus controls the vehicle to take the human operator-free trip along the approved candidate route or revised candidate route. In an example embodiment, the computer-executable program code instructions further comprise program code instructions configured to, when executed by a processor of an apparatus, cause the apparatus to at least modify the operation of one or more sensors onboard the vehicle wherein the modified operation of the one or more sensors (a) causes one or more first sensors of the one or more sensors to increase the frequency of data capture, (b) changes at least one capture threshold for at least one second sensor of the one or more sensors, or (c) a combination of causing the one or more first sensors to increase the frequency of data capture and changing at least one capture threshold for at least one second sensor. In an example embodiment, the sensor data captured by the one or more sensors is at least one of (a) stored in computer-readable memory onboard the vehicle or (b) provided to a remote computing apparatus for storage. In an example embodiment, the apparatus controls the vehicle in a no human override mode as the vehicle traverses the route from the origin location to the candidate destination. In an example embodiment, the candidate destination location is one of a pre-defined vehicle storage area, a passenger pick-up location, or a location indicated in the human operator-free trip trigger.

In still another aspect of the present invention, an apparatus is provided. The apparatus is onboard a vehicle. In an example embodiment, the apparatus comprises means for identifying a human operator-free trip trigger. The human operator-free trip trigger indicates that the vehicle is to take a human operator-free trip. The vehicle is located at an origin location of the human operator-free trip. The apparatus comprises means for, responsive to identifying the human operator-free trip trigger, identifying a candidate destination location for a human operator-free trip. The apparatus comprises means for generating a candidate route from the origin location to the candidate destination location. The apparatus comprises means for providing a trip request comprising the candidate route to an approval apparatus. The apparatus comprises means for receiving a message from the approval apparatus in response to the trip request. The apparatus comprises means for, responsive to determining that the message comprises an approval of the candidate route, controlling one or more systems of the vehicle to cause the vehicle to traverse the candidate route from the origin location to the candidate destination location.

In an example embodiment, responsive to a vehicle apparatus identifying that the vehicle apparatus is to control a vehicle to take a human operator-free trip from an origin location to the destination location, the vehicle apparatus modifies the operation of one or more sensors onboard the vehicle. The vehicle apparatus is onboard the vehicle. The vehicle apparatus controls the vehicle along a route from the origin location to the destination and causes the capturing of sensor data from the one or more sensors onboard the vehicle in accordance with the modified operation of the one or more sensors. The captured sensor data is at least one of stored onboard the vehicle or provided to a remote apparatus. The modified operation of the one or more sensors (a) causes one or more first sensors of the one or more sensors to increase the frequency of data capture, (b) changes at least one capture threshold for at least one second sensor of the one or more sensors, or (c) a combination of causing the one or more first sensors to increase the frequency of data capture and changing at least one capture threshold for at least one second sensor.

In accordance with an aspect of the present invention, a method for controlling a vehicle when the vehicle is taking a human operator-free trip is provided. In an example embodiment, the method comprises responsive to identifying, by a vehicle apparatus, that the vehicle apparatus is going to control a vehicle to take a human operator-free trip from an origin location to a destination location, modifying the operation of one or more sensors onboard the vehicle. The method further comprises controlling the vehicle, by the vehicle apparatus, along a route from the origin location to the destination and capturing sensor data from the one or more sensors onboard the vehicle in accordance with the modified operation of the one or more sensors. The method further comprises at least one of storing or providing the captured sensor data. The modified operation of the one or more sensors (a) causes one or more first sensors of the one or more sensors to increase the frequency of data capture, (b) changes at least one capture threshold for at least one second sensor of the one or more sensors, or (c) a combination of causing the one or more first sensors to increase the frequency of data capture and changing at least one capture threshold for at least one second sensor.

In an example embodiment, the method further comprises modifying the responsiveness of one or more human interaction systems of the vehicle. In an example embodiment, an emergency service personnel may be able to overcome the modification to the responsiveness of the one or more human interaction systems of the vehicle. In an example embodiment, providing the captured sensor data comprises periodically transmitting the captured sensor data such that the captured sensor data may be stored in a central sensor data repository. In an example embodiment, providing the captured sensor data comprises transmitting the captured sensor data once the vehicle reaches the destination location. In an example embodiment, the captured sensor data is stored in a black box onboard the vehicle.

According to another aspect of the present invention, an apparatus is provided. In an example embodiment, the apparatus comprises at least one processor, at least one non-transitory memory storing computer program code, at least one communications interface configured to communicate via at least one network, and one or more sensors. The apparatus is onboard a vehicle. The computer program code is configured to, when executed by the at least one processor, cause the apparatus to at least, responsive to identifying that the apparatus is going to control the vehicle to take a human operator-free trip from an origin location to a destination location, modify the operation of one or more sensors onboard the vehicle; control the vehicle along a route from the origin location to the destination and capture sensor data from the one or more sensors onboard the vehicle in accordance with the modified operation of the one or more sensors; and at least one of store or provide the captured sensor data. The modified operation of the one or more sensors (a) causes one or more first sensors of the one or more sensors to increase the frequency of data capture, (b) changes at least one capture threshold for at least one second sensor of the one or more sensors, or (c) a combination of causing the one or more first sensors to increase the frequency of data capture and changing at least one capture threshold for at least one second sensor.

In an example embodiment, the computer program code is further configured to, when executed by the at least one processor, cause the apparatus to at least modify the responsiveness of one or more human interaction systems of the vehicle. In an example embodiment, an emergency service personnel may be able to overcome the modification to the responsiveness of the one or more human interaction systems of the vehicle. In an example embodiment, providing the captured sensor data comprises periodically transmitting the captured sensor data such that the captured sensor data may be stored in a central sensor data repository. In an example embodiment, providing the captured sensor data comprises transmitting the captured sensor data once the vehicle reaches the destination location. In an example embodiment, the captured sensor data is stored in a black box onboard the vehicle.

In accordance with still another aspect of the present invention, a computer program product is provided. The computer program product comprises at least one non-transitory computer-readable storage medium having computer-executable program code instructions stored therein. The computer-executable program code instructions comprise program code instructions configured to, when executed by a processor of an apparatus, cause the apparatus to at least responsive to identifying that the apparatus is going to control the vehicle to take a human operator-free trip from an origin location to a destination location, modify the operation of one or more sensors onboard the vehicle; control the vehicle along a route from the origin location to the destination and capture sensor data from the one or more sensors onboard the vehicle in accordance with the modified operation of the one or more sensors; and at least one of store or provide the captured sensor data. The modified operation of the one or more sensors (a) causes one or more first sensors of the one or more sensors to increase the frequency of data capture, (b) changes at least one capture threshold for at least one second sensor of the one or more sensors, or (c) a combination of causing the one or more first sensors to increase the frequency of data capture and changing at least one capture threshold for at least one second sensor. The vehicle is onboard the vehicle.

In an example embodiment, computer-executable program code instructions further comprise program code instructions configured to, when executed by a processor of an apparatus, cause the apparatus to at least modify the responsiveness of one or more human interaction systems of the vehicle. In an example embodiment, an emergency service personnel may be able to overcome the modification to the responsiveness of the one or more human interaction systems of the vehicle. In an example embodiment, providing the captured sensor data comprises periodically transmitting the captured sensor data such that the captured sensor data may be stored in a central sensor data repository. In an example embodiment, providing the captured sensor data comprises transmitting the captured sensor data once the vehicle reaches the destination location. In an example embodiment, the captured sensor data is stored in a black box onboard the vehicle.

In still another aspect of the present invention, an apparatus is provided. The apparatus is onboard a vehicle. In an example embodiment, the apparatus comprises means for, responsive to identifying that the apparatus is going to control a vehicle to take a human operator-free trip from an origin location to a destination location, modifying the operation of one or more sensors onboard the vehicle. The apparatus is onboard the vehicle. The apparatus comprises means for controlling the vehicle along a route from the origin location to the destination and capturing sensor data from the one or more sensors onboard the vehicle in accordance with the modified operation of the one or more sensors. The apparatus comprises means for at least one of storing or providing the captured sensor data. The modified operation of the one or more sensors (a) causes one or more first sensors of the one or more sensors to increase the frequency of data capture, (b) changes at least one capture threshold for at least one second sensor of the one or more sensors, or (c) a combination of causing the one or more first sensors to increase the frequency of data capture and changing at least one capture threshold for at least one second sensor.

BRIEF DESCRIPTION OF THE DRAWINGS

Figure 1:
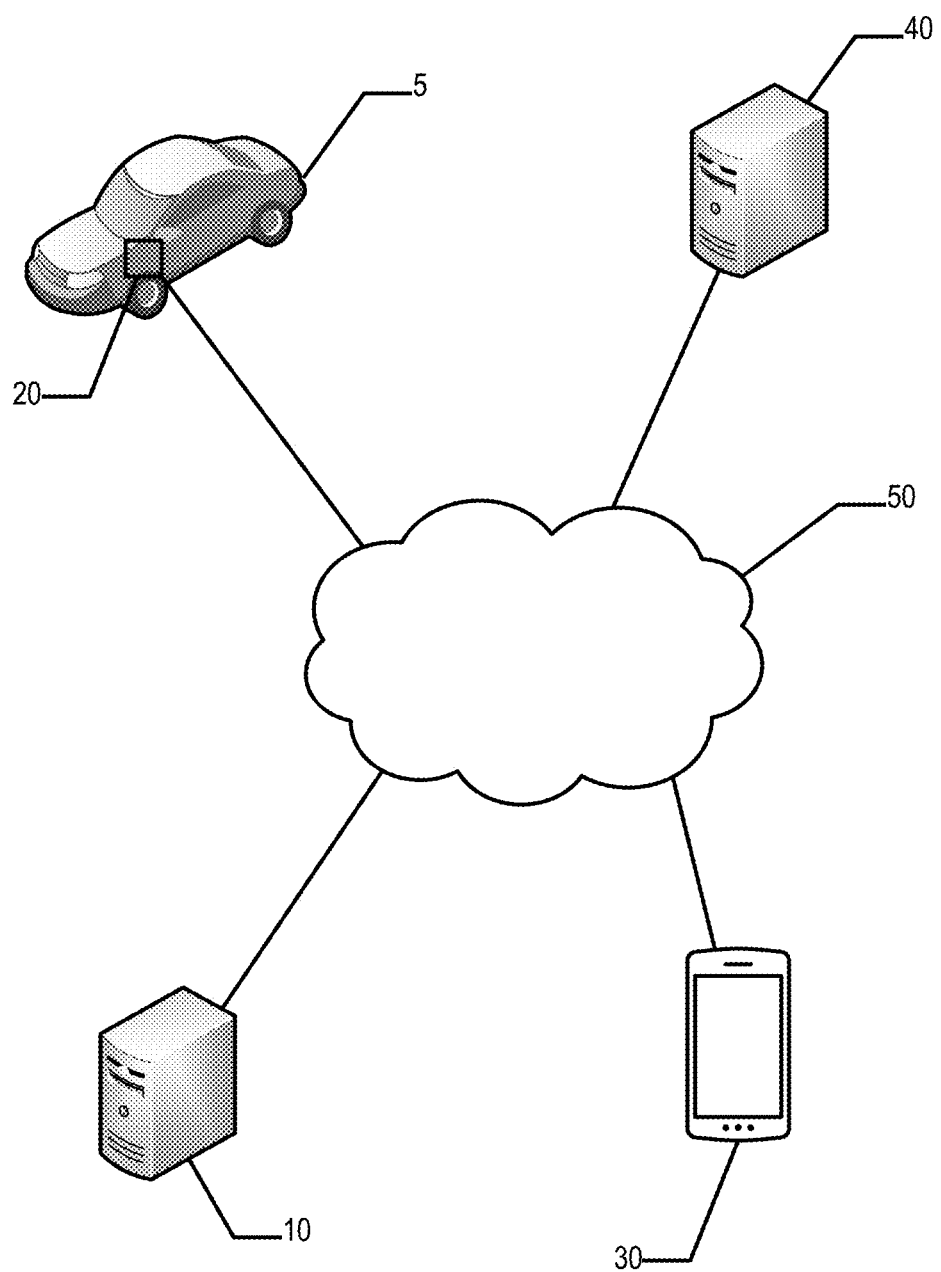
Figure 2A:
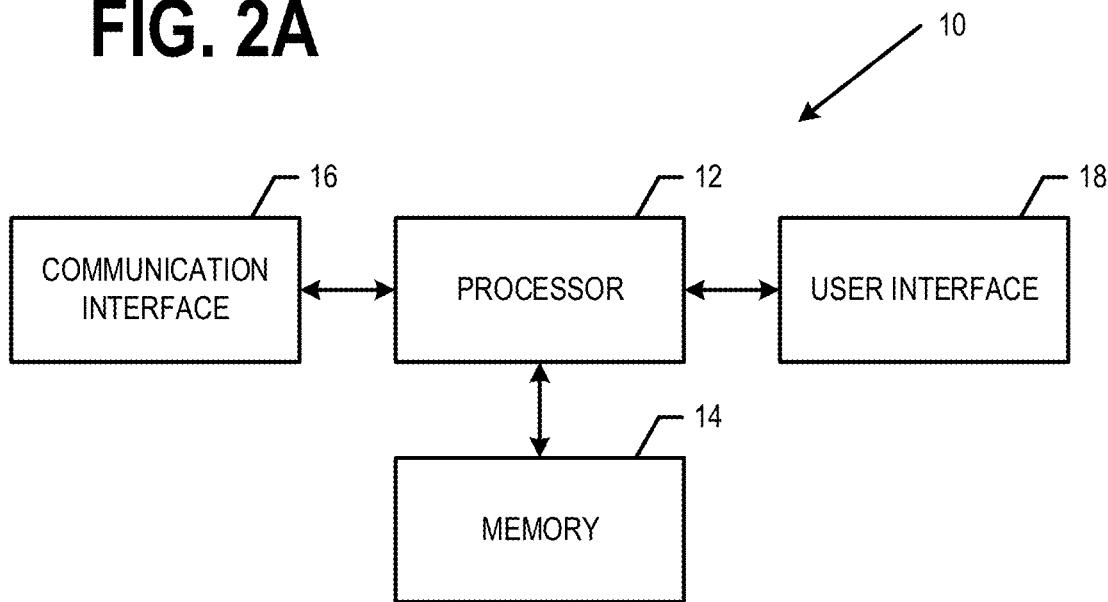
Figure 2B:
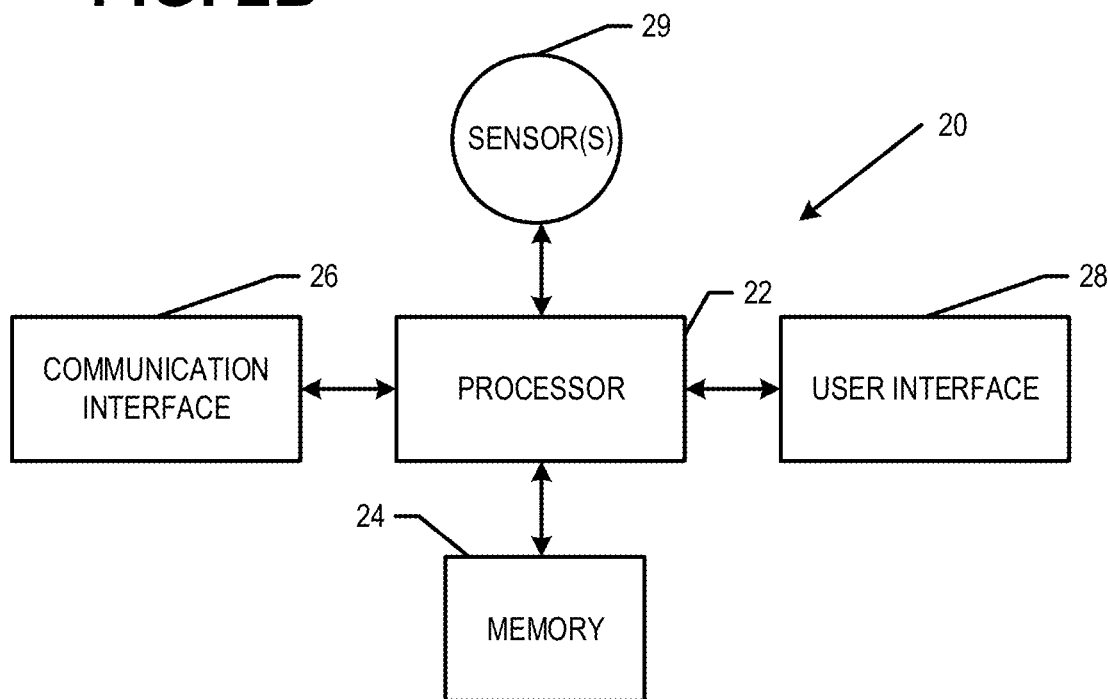
Figure 2C:
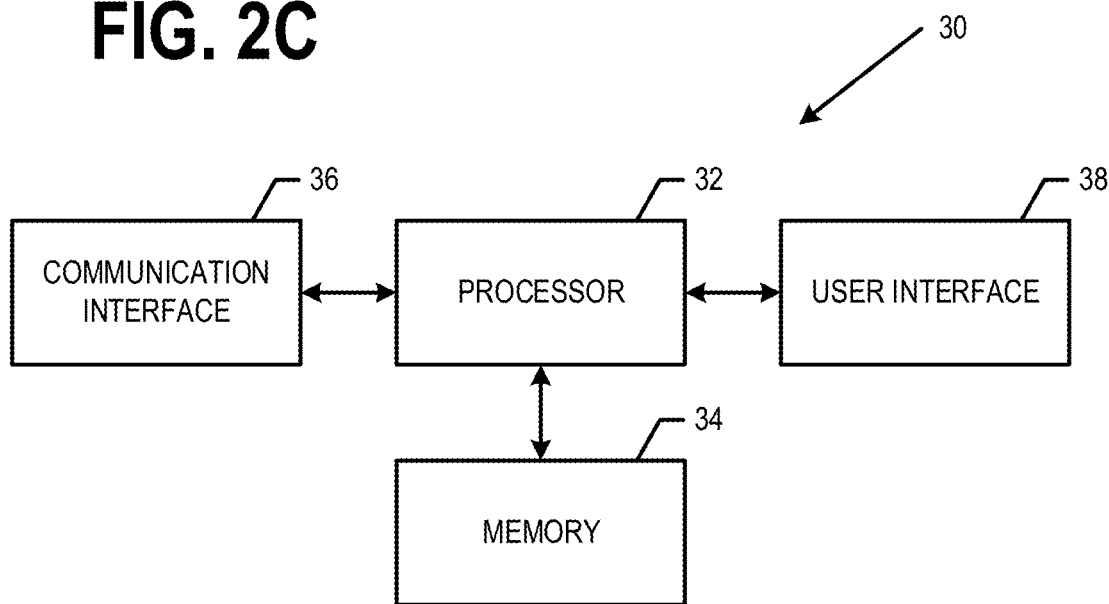
Figure 3:
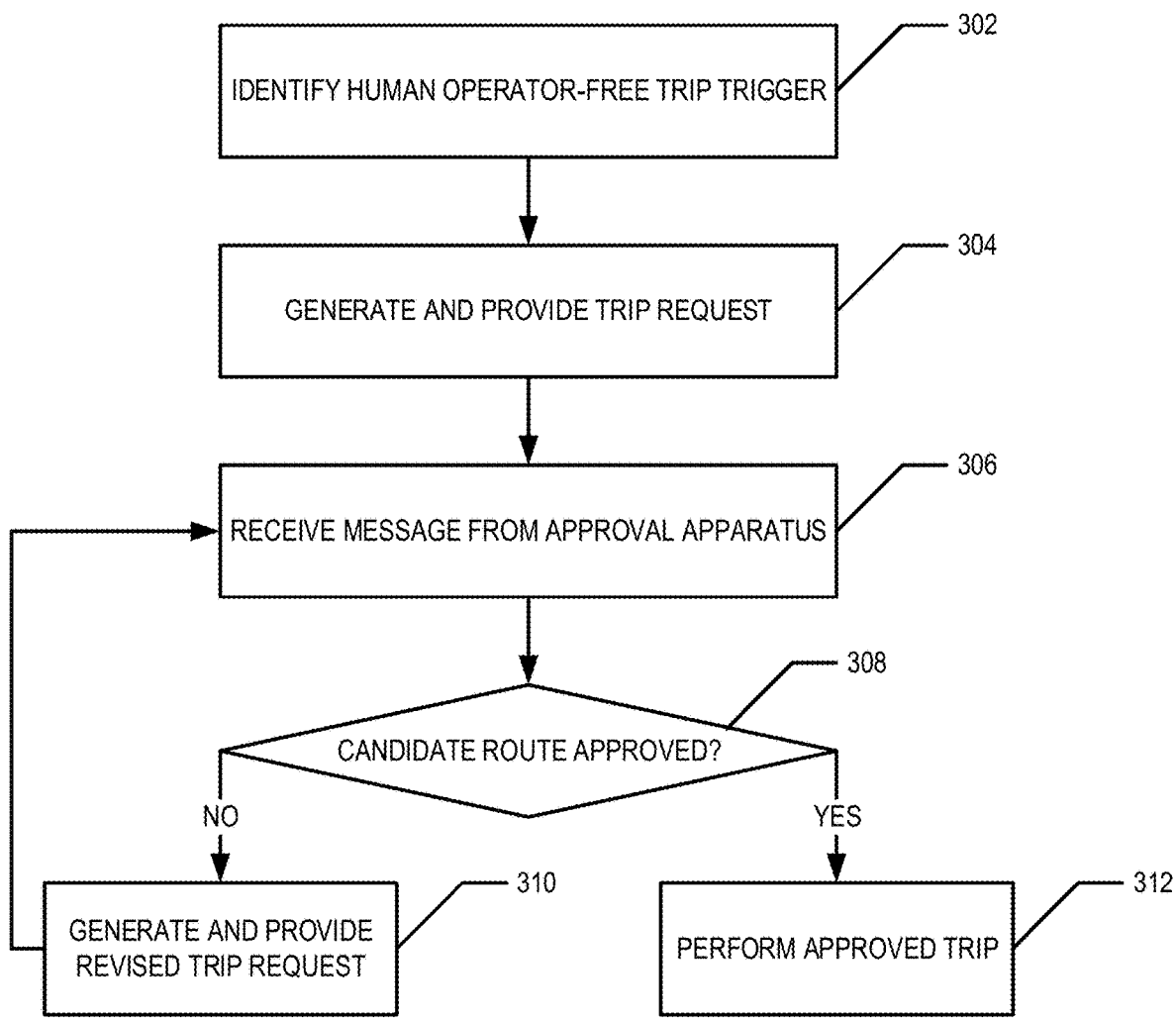
Figure 4:
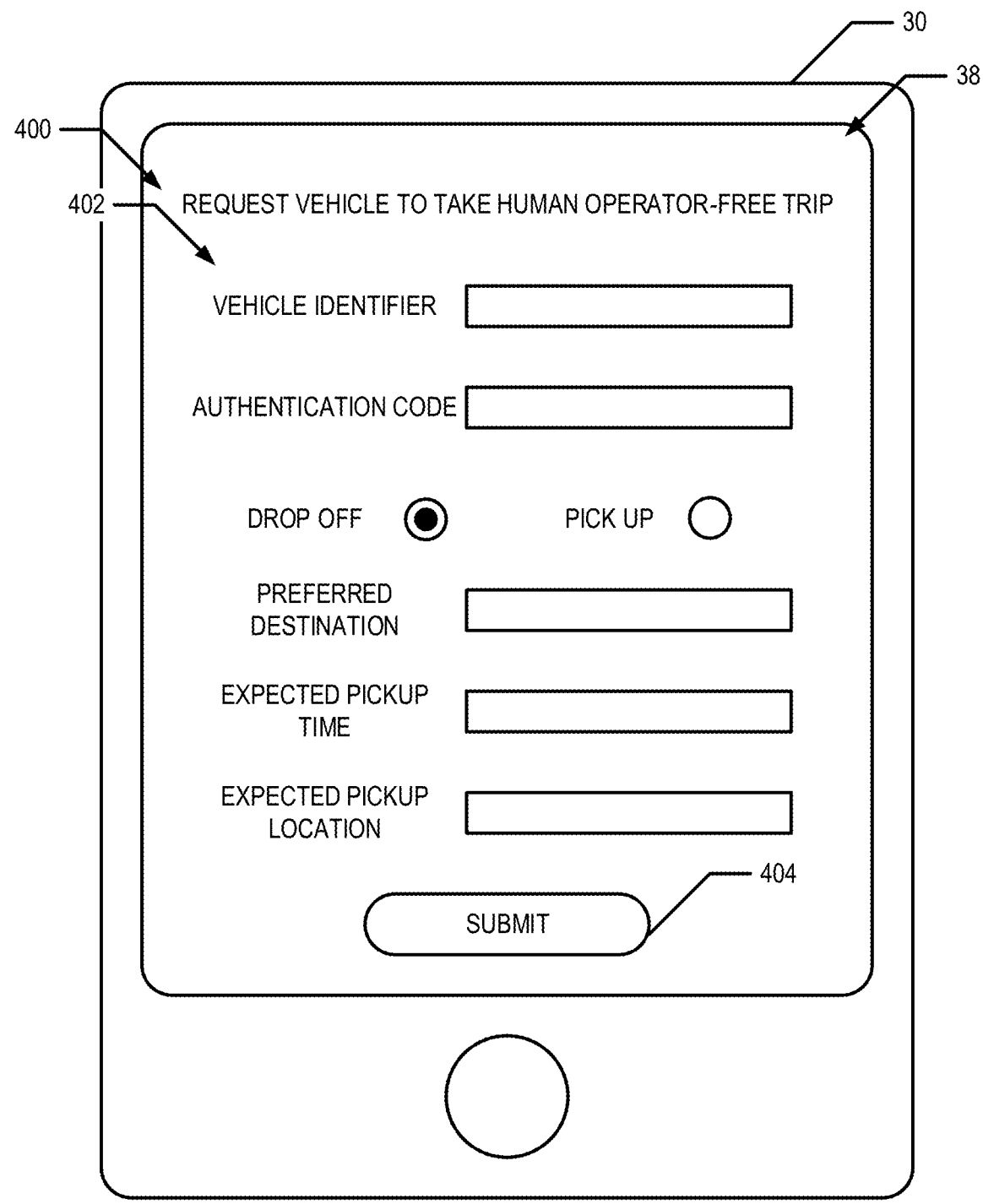
Figure 5:
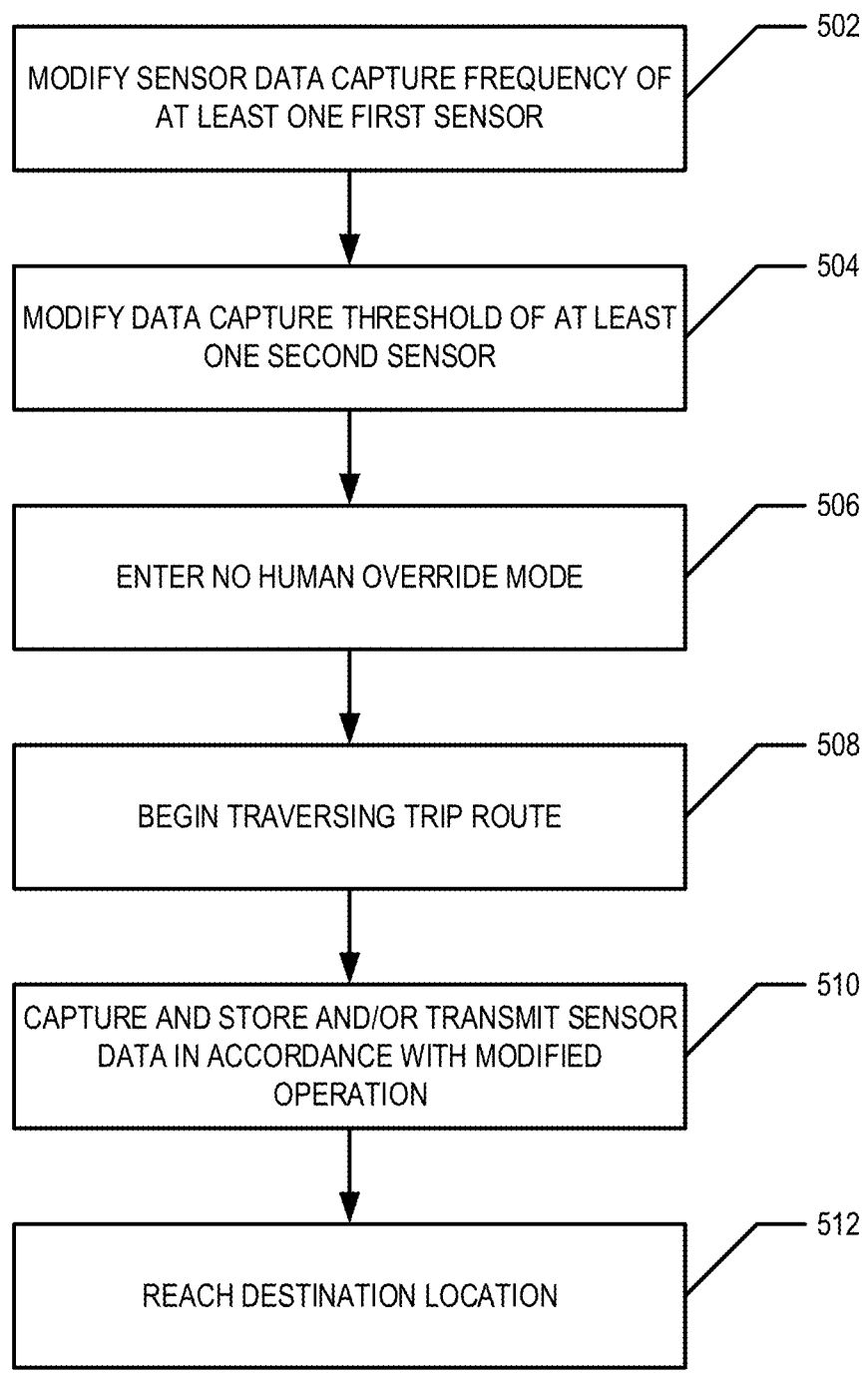

Having thus described certain example embodiments in general terms, reference will hereinafter be made to the accompanying drawings, which are not necessarily drawn to scale, and wherein:

FIG. 1 is a block diagram showing an example architecture of one embodiment of the present invention;

FIG. 2A is a block diagram of an approval apparatus that may be specifically configured in accordance with an example embodiment;

FIG. 2B is a block diagram of a vehicle apparatus that may be specifically configured in accordance with an example embodiment;

FIG. 2C is a block diagram of a user apparatus that may be specifically configured in accordance with an example embodiment;

FIG. 3 is a flowchart illustrating operations performed, such as by the vehicle apparatus of FIG. 2B, to take a human operator-free trip, according to an example embodiment;

FIG. 4 illustrates an example screen view of a human operator-free trip interactive user interface (IUI) provided by the user apparatus of FIG. 2C, according to an example embodiment;

FIG. 5 is a flowchart illustrating operations performed, such as by the vehicle apparatus of FIG. 2B, to traverse a human operator-free trip route, according to an example embodiment; and FIG. 6 is a flowchart illustrating operations performed, such as by the approval apparatus of FIG. 2A, to approve a candidate route, according to an example embodiment.

DETAILED DESCRIPTION OF SOME EXAMPLE EMBODIMENTS

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. Like reference numerals refer to like elements throughout. As used herein, the terms "data," "content," "information," and similar terms may be used interchangeably to refer to data capable of being transmitted, received and/or stored in accordance with embodiments of the present invention. As used herein, the terms "substantially" and "approximately" refer to values that are within manufacturing and/or engineering guidelines and/or limits. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware.

I. General Overview

Methods, apparatus, systems, and computer program products are provided for human operator-free trips by an autonomous, self-driving vehicle. In various embodiments, a vehicle apparatus onboard and/or coupled to an autonomous, self-driving vehicle receives and/or identifies a human operator-free trip trigger. In various embodiments, a human operator-free trip is a trip for which there are no humans onboard the vehicle and the vehicle apparatus controls the vehicle along a route. For example, a vehicle apparatus may receive the human operator-free trip trigger from a user apparatus or may generate the human operator-free trip trigger responsive to user interaction with a user interface of the vehicle apparatus. Based on the human operator-free trip trigger, map information/data corresponding to the geographical area in vicinity of the vehicle, communication with an approval apparatus, a dispatch apparatus, and/or the like, a candidate destination location for the human operator-free trip is determined. A candidate route may be determined from an origin location to the candidate destination location. In an example embodiment, the origin location is the current location of the vehicle as determined by the vehicle apparatus (e.g., via a location sensor). The vehicle apparatus may then submit a trip request to an approval apparatus. In an example embodiment, the trip request comprises the candidate route. In an example embodiment, the approval apparatus may be responsible for approving human operator-free trips for vehicles within a particular geographical region (e.g., city, zip code, county, state/province, region of a country, country, and/or the like).

The approval apparatus reviews the candidate route based on obstacle information/data and one or more rejection criteria. In various embodiments, the obstacle information/data may comprise current (e.g., real time or near real time) traffic conditions, predicted traffic conditions for a time period corresponding to the candidate route, construction information/data, current (e.g., real time or near real time) pedestrian traffic information/data, expected pedestrian traffic information/data for a time period corresponding to the candidate route, points of interest (POI) information/data, and/or the like. In various embodiments, obstacle information/data may be received from and/or determined based on a traffic control system, one or more probe apparatuses, and/or the like. The approval apparatus may determine if the obstacle information/data corresponding to the candidate route satisfies one or more rejection criteria. For example, the approval apparatus may determine if a significant amount of pedestrian traffic is expected along some portion of the candidate route, if there is a traffic incident or traffic congestion along a portion of the candidate route, if there is construction along a portion of the candidate route, and/or the like, the obstacle information/data may satisfy one or more rejection criteria. When it is determined that the candidate route and/or the obstacle information/data corresponding to the candidate route does not satisfy the one or more rejection criteria, the candidate route is approved and the approval apparatus provides a message indicating approval of the candidate route to the vehicle apparatus. When it is determined that the candidate route and/or the obstacle information/data corresponding to the candidate route does satisfy the one or more rejection criteria, the candidate route is rejected and the approval apparatus provides a message indicating rejection of the candidate route to the vehicle apparatus. In an example embodiment, the message indicating rejection of the candidate route may comprise one or more route suggestions.

Responsive to receiving the message from the approval apparatus, the vehicle apparatus determines if the message indicates approval or rejection of the candidate route. When it is determined that the message indicates approval of the candidate route, the vehicle apparatus programs the approved candidate route as a human operator-free trip route and controls the vehicle along the human operator-free trip route from the origin location to the destination location thereof. The vehicle then waits at the destination location until another human operator-free trip trigger is received and/or identified, an approved user retrieves and/or activates the vehicle, and/or the like. When it is determined that the message indicates rejection of the candidate route, the vehicle apparatus determines a revised candidate route that differs from the original/previous candidate route in candidate destination location (e.g., the destination is a revised candidate destination location) and/or route from the origin location to the candidate destination location (or revised candidate destination location). The vehicle apparatus may then submit a revised trip request to the approval apparatus. The approval apparatus may then review the revised trip request based on the corresponding obstacle information/data and the one or more rejection criteria. Based on the review of the revised trip request, the approval apparatus provides (e.g., transmits) a message to the vehicle apparatus indicating approval or rejection of the second candidate route.

In various embodiments, before the vehicle apparatus controls the vehicle to cause the vehicle to take a human operator-free trip (e.g., traverse a human operator-free trip route from the origin location to the destination location thereof with no humans onboard the vehicle), the vehicle apparatus modifies and/or changes the operation of one or more systems of the vehicle. For example, the vehicles apparatus may modify and/or change the operation of one or more sensors onboard the vehicle. For example, the vehicle apparatus may modify the operation of the one or more sensors such that (a) the one or more sensors capture data at an increased frequency compared to normal operation of the one or more sensors (e.g., when a human is onboard the vehicle), (b) at least one data capture threshold is changed for at least one of the one or more sensors (e.g., compared to a data capture threshold when a human is onboard the vehicle), or (c) a combination of increasing the data capture frequency of the one or more sensors and changing at least one data capture threshold for at least one of the one or more sensors. In an example embodiment, the vehicle apparatus controls the vehicle in a no human override mode as the vehicle takes the human operator-free trip. In an example embodiment, the no human override mode prevents a person from entering the vehicle and controlling the vehicle (e.g., via the user interface thereof) while the vehicle takes the human operator-free trip. In an example embodiment, emergency service personnel may be able to take control of the vehicle even when the vehicle is in no human override mode by entering an emergency service personnel code, physically engaging an emergency service personnel key, using an emergency service personnel wireless key (e.g., which communicates with the vehicle apparatus via radio, infrared, near field communication protocol, and/or the like), and/or the like. Operation of various other systems of the vehicle may be modified by the vehicle apparatus for the human operator-free trip.

FIG. 1 provides an illustration of an example system that can be used in conjunction with various embodiments of the present invention. As shown in FIG. 1, the system may include one or more approval apparatuses 10, one or more vehicle apparatuses 20, wherein each vehicle apparatus 20 is disposed on a vehicle 5, one or more user apparatuses 30, one or more dispatch apparatuses 40, one or more networks 50, and/or the like.

In various embodiments, the vehicle apparatus 20, may be an in vehicle navigation system, vehicle control system, a mobile computing device, a mobile data gathering platform, and/or the like. For example, a vehicle apparatus 20 may be an in vehicle navigation system mounted within, coupled to, and/or onboard a vehicle 5 such as a motor vehicle, non-motor vehicle, automobile, car, scooter, truck, van, bus, motorcycle, bicycle, Segway, golf cart, and/or the like. In various embodiments, the vehicle 5 is an autonomous, self-driving vehicle. In an example embodiment, the vehicle apparatus 20 may be a vehicle control system configured to autonomously drive a vehicle 5, assist in control of a vehicle 5 (e.g., an advanced driver-assistance system (ADAS)), monitor various aspects of the vehicle 5 (e.g., fault conditions, motor oil status, battery charge level, fuel tank fill level, and/or the like) and/or the like. In various embodiments, the vehicle apparatus 20 is configured to autonomously drive a vehicle 5 and may perform multiple functions that are similar to those performed by a vehicle apparatus 20 configured to be an ADAS (e.g., lane keeping, lane change assistance, maintaining a lane, merging, etc.). In some embodiments, vehicle apparatus 20 may be onboard a personal vehicle, commercial vehicle, public transportation vehicle, fleet vehicle, and/or other vehicle. In an example embodiment, a vehicle apparatus 20 is onboard a vehicle 5 and is used to perform one or more navigation functions corresponding to the vehicle 5 traversing at least a portion of a road network. Some non-limiting examples of navigation functions are localization, route determination, lane level route determination, route travel time determination, lane maintenance, route guidance, lane level route guidance, provision of traffic information/data, provision of lane level traffic information/data, and/or the like.

In an example embodiment, the approval apparatus 10 may be a server, group of servers, distributed computing system, and/or other computing system. For example, the approval apparatus 10 may be in communication with one or more vehicle apparatuses 20, one or more dispatch apparatuses 40, one or more data management system apparatuses, and/or the like via one or more wired and/or wireless networks 50. In an example embodiment, the approval apparatus 10 is remotely located with respect to the vehicle apparatus 20 as the approval apparatus 10 is not onboard and/coupled to the vehicle 5.

In an example embodiment, an approval apparatus 10 may comprise components similar to those shown in the example approval apparatus 10 diagrammed in FIG. 2A. In various embodiments, the approval apparatus 10 is configured to receive trip requests and obstacle information/data (e.g., via one or more networks 50), review candidate routes of trip requests in light of corresponding obstacle information/data and rejection criteria, and provide messages indicating approval or rejection of the candidate routes (e.g., via one or more networks 50). In an example embodiment, the approval apparatus 10 may be configured to determine one or more route suggestions corresponding to a trip request and include one or more route suggestions in a message. For example, as shown in FIG. 2A, the approval apparatus 10 may comprise a processor 12, memory 14, a user interface 18, a communications interface 16, and/or other components configured to perform various operations, procedures, functions or the like described herein. In at least some example embodiments, the memory 14 is non-transitory.

In various embodiments, a vehicle apparatus 20 is configured to generate and provide trip requests (e.g., comprising candidate routes), control a vehicle 5 taking a human operator-free trip, modify the operation of one or more systems of the vehicle 5 during a human operator-free trip, and/or the like. In an example embodiment, as shown in FIG. 2B, the vehicle apparatus 20 may comprise a processor 22, memory 24, a communications interface 26, a user interface 28, and one or more sensors 29. In an example embodiment, the one or more sensors 29 may comprise one or more of one or more location sensors such one or more of a GNSS sensor; IMU sensors; an odometry system, and/or the like; and/or other components configured to perform various operations, procedures, functions or the like described herein. For example, in an example embodiment, a vehicle apparatus 20 may comprise and/or be in communication with one or more sensors 29 comprising one or more of, for example, a camera(s); two dimensional (2D) and/or three dimensional (3D) light detection and ranging (LiDAR)(s); long, medium, and/or short range radio detection and ranging (RADAR); ultrasonic sensors; electromagnetic sensors; (near-) infrared (IR) cameras; 3D cameras; 360° cameras; fuel level sensors; vehicle system sensors (e.g., oil status sensors, tire pressure sensors, engine oil pressure sensors, coolant level sensors, engine/coolant temperature sensors, and/or other sensors that enable the vehicle apparatus 20 to determine one or more features of the corresponding vehicle's 5 surroundings and/or monitor the vehicle's 5 operating parameters). In at least some example embodiments, the memory 24 is non-transitory. In various embodiments, the memory 24 may store at least a portion of a geographic database, digital map, and/or the like comprising map information/data.

In various embodiments, a user apparatus 30 may be a smartphone, tablet, personal digital assistant (PDA), personal computer, desktop computer, laptop, and/or other mobile computing device. In various embodiments, the user apparatus 30 may provide a user with an IUI (e.g., via an application operating on the user apparatus 30, online portal accessed via the user apparatus, and/or the like) configured to allow a user, through interaction with the IUI, to provide user input resulting in a human operator-free trip trigger. For example, a user may operate a user apparatus 30 to access the IUI to request that a vehicle the user has just exited take a human operator-free trip to another location, request that the vehicle take a human operator-free trip to the location of the user to pick-up the user, and/or the like. For example, as shown in FIG. 2C, the user apparatus 30 may comprise a processor 32, memory 34, a user interface 38, a communications interface 36, and/or other components configured to perform various operations, procedures, functions or the like described herein. In at least some example embodiments, the memory 34 is non-transitory.

In various embodiments, a dispatch apparatus 40 may be configured to monitor the location of one or more vehicles (e.g., a fleet of vehicles) and generate and provide human operator-free trip triggers to the one or more vehicles to fulfill vehicle/ride requests of a vehicle/ride share program, provide assignments to vehicles of a fleet of vehicles, and/or the like. In various embodiments, a dispatch apparatus may comprise a processor, memory, user interface, communications interface, and/or other components configured to perform various operations, procedures, functions or the like described herein.

In an example embodiment, a vehicle apparatus 20 may be in communication with the approval apparatus 10, user apparatus 30, and/or dispatch apparatus 40 via one or more wired and/or wireless networks 50. For example, each of the components of the system may be in electronic communication with, for example, one another over the same or different wireless or wired networks 50 including, for example, a wired or wireless Personal Area Network (PAN), Local Area Network (LAN), Metropolitan Area Network (MAN), Wide Area Network (WAN), cellular network, short and/or medium range communications, Wi-Fi, and/or the like. In some embodiments, a network 50 may comprise the automotive cloud, digital transportation infrastructure (DTI), radio data system (RDS)/high definition (HD) radio or other digital radio system, and/or the like. For example, a vehicle apparatus 20 may be in communication with an approval apparatus 10 via the network 50. For example, a vehicle apparatus 20 may communicate with the approval apparatus 10 via a network, such as the Cloud. For example, the Cloud may be a computer network that provides shared computer processing resources and data to computers and other devices connected thereto.

Certain example embodiments of the approval apparatus 10, vehicle apparatus 20, and/or user apparatus 30 are described in more detail below with respect to FIGS. 2A, 2B, and 2C.

II. Example Operation

Example embodiments provide methods, apparatus, systems, computer program products, and/or the like for the taking of human operator-free trips by an autonomous, self-driving vehicle 5. In various embodiments, a vehicle apparatus 20 onboard and/or coupled to an autonomous, self-driving vehicle 5 receives and/or identifies a human operator-free trip trigger. In various embodiments, a human operator-free trip is a trip for which there are no humans onboard the vehicle and the vehicle apparatus controls the vehicle along a route. For example, a vehicle apparatus 20 may receive the human operator-free trip trigger from a user apparatus 30, dispatch apparatus 40, or may generate the human operator-free trip trigger responsive to user interaction with a user interface 28 of the vehicle apparatus. Based on the human operator-free trip trigger, map information/data (e.g., from the geographical database, digital map, and/or the like) corresponding to the geographical area in vicinity of the vehicle, communication with an approval apparatus 10, a dispatch apparatus 40, and/or the like, a candidate destination location for the human operator-free trip is determined. A candidate route may be determined from an origin location to the candidate destination location. In an example embodiment, the origin location is the current location of the vehicle 5 as determined by the vehicle apparatus 20 (e.g., via a location sensor 29). The vehicle apparatus 20 may then submit a trip request to an approval apparatus 10. In an example embodiment, the trip request comprises the candidate route. In an example embodiment, the approval apparatus 10 may be responsible for approving human operator-free trips for vehicles within a particular geographical region (e.g., city, zip code, county, state/province, region of a country, country, and/or the like). If portions of a candidate route fall under the jurisdiction or two or more approval apparatuses 10 (e.g., each responsible for a different particular geographical region) each of the two or more approval apparatuses 10 may reject or accept the portion of the candidate route that is within their respective jurisdictions.

The approval apparatus 10 reviews the candidate route based on obstacle information/data and one or more rejection criteria. In various embodiments, the obstacle information/data may comprise current (e.g., real time or near real time) traffic conditions, predicted traffic conditions for a time period corresponding to the candidate route, construction information/data, current (e.g., real time or near real time) pedestrian traffic information/data, expected pedestrian traffic information/data for a time period corresponding to the candidate route, points of interest (POI) information/data, and/or the like. In various embodiments, obstacle information/data may be received from and/or determined based on a traffic control system, one or more probe apparatuses, and/or the like. The approval apparatus 10 may determine if the obstacle information/data corresponding to the candidate route satisfies one or more rejection criteria. For example, the approval apparatus 10 may determine if a significant amount of pedestrian traffic is expected along some portion of the candidate route, if there is a traffic incident or traffic congestion along a portion of the candidate route, if there is construction along a portion of the candidate route, and/or the like, the obstacle information/data may satisfy one or more rejection criteria. When it is determined that the candidate route and/or the obstacle information/data corresponding to the candidate route does not satisfy the one or more rejection criteria, the candidate route is approved and the approval apparatus 10 provides a message (e.g., via one or more networks 50) indicating approval of the candidate route to the vehicle apparatus 20. When it is determined that the candidate route and/or the obstacle information/data corresponding to the candidate route does satisfy the one or more rejection criteria, the candidate route is rejected and the approval apparatus 10 provides a message (e.g., via one or more networks 50) indicating rejection of the candidate route to the vehicle apparatus 20. In an example embodiment, the message indicating rejection of the candidate route may comprise one or more route suggestions. In an example embodiment, a route suggestion comprise a revised candidate destination location, a revised route, one or more road segments that should be avoided, one or more road segments that are acceptable to be included in a route for a human operator-free trip, and/or the like.

Responsive to receiving the message from the approval apparatus 10, the vehicle apparatus 20 determines if the message indicates approval or rejection of the candidate route. When it is determined that the message indicates approval of the candidate route, the vehicle apparatus 20 programs the approved candidate route as a human operator-free trip route and controls the vehicle 5 along the human operator-free trip route from the origin location to the destination location thereof. The vehicle 5 then waits at the destination location until another human operator-free trip trigger is received and/or identified, an approved user retrieves and/or activates the vehicle 5, and/or the like. When it is determined that the message indicates rejection of the candidate route, the vehicle apparatus 20 determines a revised candidate route that differs from the original/previous candidate route in candidate destination location (e.g., the destination is a revised candidate destination location) and/or route from the origin location to the candidate destination location (or revised candidate destination location). The vehicle apparatus 20 may then submit a revised trip request to the approval apparatus 10. The approval apparatus 10 may then review the revised trip request based on the corresponding obstacle information/data and the one or more rejection criteria. Based on the review of the revised trip request, the approval apparatus 10 provides (e.g., transmits via one or more networks 50) a message to the vehicle apparatus 20 indicating approval or rejection of the revised candidate route.

Before the vehicle apparatus 20 controls the vehicle 5 to cause the vehicle to take a human operator-free trip (e.g., traverse a candidate route from the origin location to the destination location thereof with no humans onboard the vehicle), the vehicle apparatus 20 modifies and/or changes the operation of one or more systems of the vehicle 5, in various embodiments. For example, the vehicles apparatus 20 may modify and/or change the operation of one or more sensors 29 onboard the vehicle 5. For example, the vehicle apparatus 20 may modify the operation of the one or more sensors 29 such that (a) the one or more sensors 29 capture data at an increased frequency compared to normal operation of the one or more sensors 29 (e.g., when a human is onboard the vehicle 5), (b) at least one data capture threshold is changed for at least one of the one or more sensors 29 (e.g., compared to a data capture threshold when a human is onboard the vehicle 5), or (c) a combination of increasing the data capture frequency of the one or more sensors 29 and changing at least one data capture threshold for at least one of the one or more sensors 29. In an example embodiment, the vehicle apparatus 20 controls the vehicle 5 in a no human override mode as the vehicle 5 takes the human operator-free trip. In an example embodiment, the no human override mode prevents a person from entering the vehicle 5 and controlling the vehicle 5 (e.g., via the user interface of the vehicle (e.g., steering wheel, brake pedal, acceleration pedal) or via the user interface 28 of the vehicle apparatus 20) while the vehicle 5 takes the human operator-free trip. In an example embodiment, emergency service personnel may be able to take control of the vehicle 5 even when the vehicle is in no human override mode by entering an emergency service personnel code, physically engaging an emergency service personnel key, using an emergency service personnel wireless key (e.g., which communicates with the vehicle apparatus via radio, infrared, near field communication protocol, and/or the like), and/or the like. Operation of various other systems of the vehicle 5 may be modified by the vehicle apparatus 20 for the human operator-free trip. Upon completion of the human operator-free trip (e.g., when the vehicle 5 reaches the destination location and converts to stand-by and/or off mode), the vehicle apparatus 20 may convert and/or modify the operation of the one or more systems of the vehicle 5 back to normal mode settings (e.g., revert the settings and/or operation of the vehicle systems back to what they were previous to the modification and/or changes made for taking the human operator-free trip).

Exemplary Operation of Vehicle Apparatus

In various embodiments, the vehicle apparatus 20 is configured to control a vehicle 5 during a human operator-free trip. For example, the vehicle apparatus 20 may be configured to receive and/or identify a human operator-free trip trigger. Responsive thereto, the vehicle apparatus 20 may generate a trip request. In an example embodiment, the trip request comprises a candidate route for the human operator-free trip. The vehicle apparatus 20 may then provide the human operator-free trip request to an approval apparatus 10 (e.g., via one or more networks 50) and waits for a message from the approval apparatus 10. The message may indicate that the candidate route is approved or rejected. If the candidate route is rejected, the vehicle apparatus 20 may generate a new or updated and/or modified trip request and provide the new or updated and/or modified trip request to the approval apparatus 10. If the candidate route is approved, the vehicle apparatus 20 controls the vehicle 5 to take the human operator-free trip. In various embodiments, the vehicle apparatus 20 modifies and/or changes the operation of one or more systems of the vehicle 5 for the duration of the human operator-free trip. For example, the vehicle apparatus 20 may modify the collection and/or capturing of sensor information/data by the one or more sensors 29, operate the vehicle 5 in a no human override mode, and/or the like.

FIG. 3 provides a flowchart illustrating operations performed, such as by the vehicle apparatus 20, to take a human operator-free trip, according to an example embodiment. Starting at block 302, a human operator-free trip trigger is received and/or identified. For example, the vehicle apparatus 20 may receive and/or identify a human operator-free trip trigger. For example, the vehicle apparatus 20 may comprise means, such as the processor 22, memory 24, communications interface 26, user interface 28, and/or the like for receiving and/or identifying a human operator-free trip trigger. In various embodiments, the human operator-free trip trigger comprises one or more of an indication that the vehicle 5 is to take a human operator-free trip, a destination for the human operator-free trip, and/or the like. In an example embodiment, the human operator-free trip trigger may be generated and/or identified based on user interaction with the user interface 28 of the vehicle apparatus 20. For example, a user exiting the vehicle 5 may use the user interface 28 to provide input indicating the user would like the vehicle 5 to take a human operator-free trip. In an example embodiment, the human operator-free trip trigger may be automatically generated and/or identified by the processor 22 based on one or more sensors 29 determining that there are no humans present in the vehicle and/or that the humans present in the vehicle are not capable of taking control and/or are not allowed to take control of the vehicle 5 and the location of the vehicle being a no parking area. For example, the memory 24 may comprise a geographical database that stores map information/data. In an example embodiment, the map information/data may include information identifying no parking areas, vehicle storage areas (e.g., parking lots, parking garages, etc.), and/or the like. If the vehicle apparatus 20 determines that there are no humans located within the vehicle 5 and the vehicle 5 has been parked in a no parking area for longer than a maximum wait time, the vehicle apparatus 20 may generate and/or identify a human operator-free trip trigger. In an example embodiment, the vehicle apparatus 20 may receive a human operator-free trip trigger communication from a dispatch apparatus 40 and identify a human operator-free trip trigger based on the human operator-free trip trigger communication. In an example embodiment, the vehicle apparatus 20 may receive a human operator-free trip trigger communication from a user apparatus 30 and identify a human operator-free trip trigger based on the zero trip trigger communication.

In an example embodiment, a user may access a human operator-free trip IUI 400 via a user interface 38 of a user apparatus 30, as shown in FIG. 4. In an example embodiment, a human operator-free trip IUI 400 comprises a plurality of content fields 402 and a selectable submission element 404. The plurality of content fields 402 may provide fields in which a user may enter a string, select an option from two or more selectable options, indicate a location on a map, and/or the like. For example, the plurality of content fields 402 may comprise a field which a user can use to indicate whether the human operator-free trip is to move the car out of a no parking area after dropping off the user or to pick up a user. In an example embodiment, the plurality of content fields 402 may comprise a vehicle identifier such as the vehicle identification number (VIN) for the vehicle, the vehicle license plate number, a nickname for the vehicle, and/or human and/or machine readable indicia used to uniquely identify the vehicle 5. In an example embodiment, the plurality of content fields 402 may comprise an authentication code field in which a user is expected to enter a password, personal identification number (PIN), and/or the like corresponding to a user account/profile and/or the vehicle identifier to ensure that the user is approved and/or allowed to request a human operator-free trip for the vehicle 5 identified by the vehicle identifier. In various embodiments, in particular if the human operator-free trip is a drop off, the plurality of content fields may comprise a field via which the user may indicate a preferred destination location for the human operator-free trip. In various embodiments, the plurality of content fields may comprise one or more fields via which the user may indicate an expected and/or desired pick up location and/or pick up time. In an example embodiment, when an expected and/or desired pick up location and/or pick up time is provided when the user requests a drop off human operator-free trip, the candidate destination location of a candidate route for the drop off human operator-free trip may be determined based on the time between the drop off time (e.g., the current time) and the expected and/or desired pick up time. For example, if a user indicates (e.g., via expected and/or desired pick up time field) that the user wants to be picked up in one hour, the destination location of the human operator-free trip should be close enough to the drop off and/or pick up location that the vehicle 5 can travel to the destination location and then travel to the pick up location in one hour or less. Various embodiments may comprise a variety of content fields 402 through which a user may provide and/or select information/data via the user interface 38. A user may select the selectable submission element 404 to cause the user apparatus 30 to generate and provide the human operator-free trip trigger communication to the vehicle apparatus 20 and/or a dispatch apparatus 40 such that the dispatch apparatus 40 may authenticate and/or authorize the user and/or provide a human operator-free trip trigger communication to the vehicle apparatus 20.

Returning to FIG. 3, at block 304, a trip request is generated and provided such that the approval apparatus 10 receives the trip request. For example, the vehicle apparatus 20 may generate the trip request and provide the trip request such that the approval apparatus 10 receives the trip request. For example, the vehicle apparatus 20 may comprise means, such as processor 22, memory 24, communications interface 26, and/or the like, for generating and providing a trip request such that the approval apparatus 10 receives the trip request. In an example embodiment, generating the trip request comprises determining a candidate destination location for the human operator-free trip and determining a candidate route from the origin location (e.g., the current location of the vehicle apparatus 20 as determined by one or more location sensors 29) to the candidate destination location. In an example embodiment, the vehicle apparatus 20 may determine the candidate destination location and/or the candidate route. In an example embodiment, the vehicle apparatus 20 may use one or more Cloud-based services to determine the candidate destination location and/or the candidate route or may receive the candidate destination location and/or the candidate route from a user apparatus 30 or dispatch apparatus 40.

In various embodiments, the candidate destination location is one of a user selected and/or provided preferred destination location. For example, the user may (e.g., via interaction with the user interface 28 of the vehicle apparatus and/or the user interface 38 of the user apparatus 30) indicate a preferred destination location. In an example embodiment, a vehicle apparatus 20 owned by a particular user may be programmed with a preferred and/or default destination location of the user (e.g., the user's driveway, home/work parking spot, a leased or owned parking spot, a vehicle storage area located near the user's home and/or work, a vehicle storage area located outside of and/or in the vicinity of the city in which the user lives and/or works, and/or the like) and/or one or more preferred destination locations may be stored as part of a user account/profile corresponding to the user. In an example embodiment, the user selected and/or provided preferred destination location is a parking spot owned and/or rented by the user (e.g., the user's driveway or home/work parking area); a vehicle service provider location (e.g., a mechanic shop, a car wash, and/or the like); a location where the vehicle is to drop off or pick up an item; and/or the like; a preferred vehicle storage area; and/or the like.

In various embodiments, a vehicle storage area is a parking lot, parking deck, and/or the like for storing vehicles when the vehicles are not in use. In an example embodiment, the vehicle apparatus 20 and/or the user apparatus 30 may store at least a portion of geographic database comprising a vehicle storage area database. For example, the vehicle storage area database may comprise storage area information/data corresponding to one or more vehicle storage areas. The storage area information/data for a vehicle storage area may comprise information/data indicating the location of the vehicle storage area, the boundary of the vehicle storage area (e.g., a geo-fence), whether the vehicle storage area is private (e.g., a vehicle storage area only open to fleet vehicles of one or more fleets, open to a defined set of vehicles, open only to vehicles that provide an appropriate passcode for entering the vehicle storage area, and/or the like) or public (e.g., a vehicle storage area open to any vehicle), the number of parking spaces in the vehicle storage area, the number of vehicles currently stored in the vehicle storage area, whether electric charging stations are located and/or available at the vehicle storage area, and/or the like. In an example embodiment, a private vehicle storage area may require a passcode, token, and/or the like for access to the private vehicle storage area and/or for a candidate route having the private vehicle storage area as the destination to be approved. In an example embodiment, private vehicle storage area may be a parking spot, parking lot, parking garage and/or the like that is owned, leased, and/or the like by the user and/or the vehicle owner or another entity. For example, a private vehicle storage area may be a parking spot at a particular user's house, a parking garage in which the user pays for a parking pass, a parking lot for storing fleet vehicles that are not currently in use, a pay-to-park parking lot that requires user registration such that the user's account may be debited for parking fees, and/or the like.

In an example embodiment, the candidate destination location is a selected by the vehicle apparatus 20. For example, the candidate destination location may be a vehicle storage area selected from the vehicle storage area database by the vehicle apparatus 20 based on one or more of the number of available parking spaces at the vehicle storage area, the location of the vehicle storage area, whether the vehicle storage area is public or private, and/or the like. In an example embodiment, the candidate destination location may be provided by a dispatch apparatus 40. For example, the dispatch apparatus 40 may provide a candidate destination location as part of a human operator-free trip trigger communication to which the vehicle should travel to pick up one or more passengers, pick up or drop off an item, receive a service (e.g., a mechanical service, a software update service, a car wash, and/or the like), and/or to await further instructions.

In various embodiments, the candidate route is a route from the origin location (e.g., the current location of the vehicle 5 as determined by a location sensor 29 of the vehicle apparatus 20 onboard and/or coupled to the vehicle 5) to the destination location. In various embodiments, the candidate route is generated by the vehicle apparatus 20. In various embodiments, the vehicle apparatus 20 may communicate with a dispatch apparatus 40, a routing apparatus, use a Cloud-based routing service (e.g., a Cloud-based routing service powered by the Open Location Platform (OLP)), and/or the like. In an example embodiment, the candidate route may be determined based on various routing criteria such as avoiding known obstacles (e.g., construction, traffic incidents, potholes, lane and/or road closures, and/or the like), avoiding known high pedestrian traffic areas, minimizing distance traveled, minimizing and/or maximizing use of a particular kind of road, a desired fuel efficiency and/or fuel usage, illumination levels along the route, weather along the route, traffic signals along the route, driving difficulty of one or more road segments and/or maneuvers along the route, and/or the like.

In various embodiments, after determining (and/or receiving) the candidate destination location and the candidate route, the vehicle apparatus 20 provides (e.g., transmits) a trip request comprising the candidate route such that the approval apparatus 10 receives the trip request. In an example embodiment, the trip request comprises the candidate route, the candidate destination location, the expected travel time for traversing the candidate route, information regarding the vehicle 5 (e.g., vehicle identifier, make, model, sensor arrangement, safety features, etc.) and/or the like. In an example embodiment, the trip request may comprise one or more passcodes, tokens, and/or the like for accessing a private vehicle storage area.

After providing the trip request, the vehicle apparatus 20 waits to receive a message provided by the approval apparatus 10. The message indicates the approval or rejection of the candidate route. In an example embodiment, when the message indicates the rejection of the candidate route, the message further provides one or more route suggestions (e.g., a revised candidate destination location, one or more road segments a human operator-free trip route should not include for the time frame corresponding to the trip request, one or more road segments that a human operator-free trip route may include for the time frame corresponding to the trip request, and/or the like) that may be used (e.g., by the vehicle apparatus 20) to generate a revised candidate route. At block 306, the message provided by the approval apparatus 10 is received. For example, the vehicle apparatus 20 receives the message provided by the vehicle apparatus 10. For example, the vehicle apparatus 20 may comprise means, such as the processor 22, memory 24, communications interface 26, and/or the like, for receiving the message provided by the approval apparatus 10.

At block 308, the message provided by the approval apparatus 10 is processed to determine if the message indicates that the candidate route is approved or rejected. For example, the vehicle apparatus 20 may process the message to determine if the message indicates that the candidate route is approved or rejected. For example, the vehicle apparatus 20 may comprise means, such as the processor 22, memory 24, and/or the like for processing the message to determine if the message indicates that the candidate route is approved or rejected.

Responsive to determining, at block 308, that the candidate route is rejected, the vehicle apparatus 20 may generate a revised trip request, at block 310. For example, if the vehicle apparatus 20 determines that the message indicates that the candidate route is rejected, the vehicle apparatus 20 may determine a revised candidate route. In various embodiments, the revised candidate route is the previous candidate route with minor changes (e.g., changes to avoid a particular road segment or to include a particular road segment), a modified route from the origin location to the candidate destination location (e.g., a route that significantly differs from the previous candidate route), or a new route from the origin location to a revised candidate destination location.

In various embodiments, the revised candidate route may be determined based on route suggestions included in the message provided by the approval apparatus 10. In various embodiments, the revised candidate route and/or revised candidate destination location may be selected based on criteria similar to the previous candidate route and/or previous candidate destination location. For example, if the user provided (e.g., via user interaction with the user interface 28 of the vehicle apparatus 20 or user interface 38 the user apparatus 30, or user preferences stored as part of a user account/profile), the user may be notified if the candidate route is rejected and a revised candidate destination location is determined to allow the user the ability to accept or reject the revised candidate destination location. For example, the vehicle apparatus 20 may provide a change in destination location communication such that the user apparatus 30 receives the change in destination location communication and provides information/data regarding the revised candidate destination location to the user via the user interface 38. In an example embodiment, the user interface 38 may further provide the user with one or more selectable elements such that the user may accept or reject the revised candidate destination location via interaction with the user interface 38 via the one or more selectable elements. In such an embodiment, the user apparatus 30 may then provide a communication indicating the user's acceptance or rejection of the revised candidate destination location such that the vehicle apparatus 20 may receive the communication and proceed accordingly.

After determining (and/or receiving from the dispatch apparatus 40 and/or another routing apparatus/Cloud-based routing service) a revised candidate route, the vehicle apparatus 20 generates a revised trip request and provides the revised trip request such that the approval apparatus 10 receives the revised trip request. For example, the vehicle apparatus 20 may comprise means, such as processor 22, memory 24, communications interface 26, and/or the like, for determined and/or receiving a revised candidate route, generating a revised trip request comprising at least a portion of the revised candidate route, and providing the revised trip request such that the approval apparatus 10 receives the revised trip request. In an example embodiment, the revised trip request only includes changes to the original trip request (e.g., changes between the revised candidate route and the previous candidate route, change in expected travel time, a passcode or token needed for accessing the revised destination location, and/or other changes) and the revised trip request comprises an identifier (e.g., the vehicle identifier, a trip request identifier, and/or the like) that is used to link the revised trip request to the previous trip request. In an example embodiment, the revised trip request is a new trip request that is independent of the previous trip request. For example, the revised trip request may comprise the revised candidate route, the (revised) candidate destination location, the expected travel time for traversing the revised candidate route, information regarding the vehicle 5 (e.g., vehicle identifier, make, model, sensor arrangement, safety features, etc.), any passcodes, tokens, and/or the like for accessing a private vehicle storage area corresponding to the (revised) candidate destination location, and/or the like.

Responsive to determining, at block 308, that the (revised) candidate route is approved, the vehicle apparatus 20 may control the vehicle 5 to take the human operator-free trip, at block 312. For example, the vehicle apparatus 20 may process the message provided by the approval apparatus 10 and determine that the message indicates that the candidate route or the revised candidate route was approved. The vehicle apparatus 20 may then program the approved candidate route or approved revised candidate route as a human operator-free trip route. The vehicle apparatus 20 may then control the vehicle 5 such that the vehicle 5 traverses the human operator-free trip route from the origin location to the destination location of the human operator-free trip route in accordance with the planned route. For example, the vehicle apparatus 20 may comprise means, such as the processor 22, memory 24, sensors 29, and/or the like, for controlling the vehicle 5 to take the human operator-free trip in accordance with the human operator-free trip route.

FIG. 5 provides a flowchart illustrating operations performed, such as by the vehicle apparatus of FIG. 2B, to traverse a human operator-free trip route, according to an example embodiment. In various embodiments, the human operator-free trip route is an approved candidate route and/or approved revised candidate route or other route that is deemed appropriate for a human operator-free trip route. In various embodiments, a human operator-free trip route is a route from an origin location to destination location. In various embodiments, the origin location is the current location of the vehicle 5 as determined by one or more location sensors 29 onboard and/or coupled to the vehicle 5. The destination location is a vehicle storage area, pick up or drop off location (of one or more humans and/or one or more items), a vehicle service provider location (e.g., a mechanic shop, a car wash, and/or the like), and/or the like. Responsive to receiving and/or identifying a human operator-free trip trigger and/or the programming of a human operator-free trip route by the vehicle apparatus 20, the vehicle apparatus 20 may modify operation of one or more systems of the vehicle 5 such that the vehicle 5 is operated in a zero passenger mode for the duration of the human operator-free trip. For example, when the vehicle 5 is in zero passenger mode, one or more sensors 29 onboard and/or coupled to the vehicle 5 may be operated in a different manner than when a human passenger is onboard the vehicle 5; the handling and/or braking systems may be operated in a different manner than when a human passenger is onboard the vehicle 5; the user interface 28 of the vehicle apparatus 20 may be less responsive than when a human passenger is onboard the vehicle 5; the cabin comfort system (e.g., heat, air conditioning, audio system, and/or the like) may be operated differently than when a human passenger is onboard the vehicle 5 (e.g., turned off); and/or other systems of the vehicle 5 may be operated in a manner that is different from when a human passenger is onboard the vehicle 5 for the duration of the human operator-free trip. For example, one or more of the systems of the vehicle 5 may be modified in accordance with a zero passenger mode.

Starting at block 502, the capture frequency of one or more first sensors of the one or more sensors 29 may be modified. For example, the vehicle apparatus 20 may adjust the capture frequency of one or more first sensors. For example, the vehicle apparatus 20 may comprise means for adjusting the capture frequency of one or more first sensors of the one or more sensors 29. For example, the capture frequency of one or more first sensors may be increased such that sensor information/data is a captured at a higher rate when the vehicle 5 is operated in zero passenger mode compared to when the vehicle is operated in normal (e.g., human passenger present) mode. For example, the vehicle apparatus 20 may comprise means, such as the processor 22, memory 24, one or more sensors 29, and/or the like, for adjusting and/or modifying one or more capture frequencies each corresponding to one or more first sensors of the one or more sensors 29 onboard and/or coupled to the vehicle 29.

At block 504, a capture threshold of one or more second sensors of the one or more sensors 29 may be modified. For example, the vehicle apparatus 20 may adjust the capture threshold of one or more second sensors. For example, the vehicle apparatus 20 may comprise means for adjusting the capture threshold of one or more second sensors. For example, one or more second sensors may capture corresponding sensor information/data only when the capture threshold is satisfied. For example, the one or more second sensors may comprise an accelerometer that is configured to only capture sensor information/data when the accelerometer detects an acceleration that is greater than a corresponding capture threshold. In such an example, the corresponding capture threshold may be reduced such that, when the vehicle 5 is operated in zero passenger mode, sensor information/data corresponding to accelerations that are lower than the normal mode capture threshold are captured. In another example, the one or more second sensors may comprise an ambient light level sensor that is configured to only capture sensor information/data when the ambient light about the vehicle is less than a corresponding capture threshold. In such an example, the corresponding capture threshold may be increased such that, when the vehicle 5 is operated in zero passenger mode, sensor information/data corresponding to ambient lighting levels that are brighter than the normal mode capture threshold are captured. For example, one or more capture thresholds corresponding to one or more second sensors of the one or more sensors 29 may be modified and/or adjusted such that additional sensor information/data is captured when the vehicle 5 is operated in zero passenger mode compared to when the vehicle 5 is operated in normal mode (e.g., human passenger present mode). For example, the vehicle apparatus 20 may comprise means, such as the processor 22, memory 24, one or more sensors 29, and/or the like, for adjusting and/or modifying one or more capture thresholds corresponding to one or more second sensors of the one or more sensors 29 onboard and/or coupled to the vehicle 5.

At block 506, the vehicle 5 and/or vehicle apparatus 20 enters no human override mode. For example, when the vehicle 5 is in normal mode (e.g., human passenger present mode), a passenger sitting the driver's seat of the vehicle 5 may be able to override a programmed route, speed, handling, and/or the like. For example, the passenger sitting in the driver's seat may interact with the user interface 28 of the vehicle apparatus 20 to change the route being traveled by the vehicle 5. In another example, the passenger sitting in the driver's seat may interact with one or more controls of the vehicle (e.g., cruise control off/cancel button, steering wheel, accelerator and/or brake pedals, and/or the like) to override the automated maneuvering of the vehicle 5. However, when the vehicle is operating in no human override mode, a human onboard the vehicle 5 is not able to adjust or modify the route being traversed by the vehicle or influence the maneuvering of the vehicle (e.g., by using the steering wheel, accelerator and/or brake pedals, and/or the like). For example, when a vehicle is operating in no human override mode, the responsiveness of one or more human interaction systems (e.g., steering wheel, accelerator and/or brake pedals, user interface 28, and/or the like) may be reduced such that the vehicle does not respond to human interaction with the one or more human interaction systems. In an example embodiment, the doors may be locked when the vehicle 5 is in no human override mode to prevent unauthorized individuals from entering the unoccupied vehicle. In various embodiments, operating the vehicle in no human override mode prevents an unauthorized person from entering the vehicle when the vehicle is taking a human operator-free trip and taking the vehicle 5 to a location other than the destination location. In an example embodiment, emergency service personnel may be able to take control of the vehicle even when the vehicle is in no human override mode by entering an emergency service personnel code, physically engaging an emergency service personnel key, using an emergency service personnel wireless key (e.g., which communicates with the vehicle apparatus 20 via radio, Wi-Fi, infrared, near field communication protocol, and/or the like), and/or the like. Operation of various other systems of the vehicle may be modified by the vehicle apparatus for the human operator-free trip in various embodiments.

At block 508, the vehicle 5 begins to traverse the human operator-free trip route. For example, the vehicle apparatus 20 controls the vehicle 5 to cause the vehicle 5 to begin traversing the human operator-free trip route. For example, the vehicle apparatus 20 comprises means, such as the processor 22, memory 24, sensors 29, and/or the like, for controlling the vehicle 5 to cause the vehicle 5 to begin traversing the human operator-free trip route.

At block 510, as the vehicle 5 traverses the human operator-free trip route, one or more sensors 29 onboard and/or coupled to the vehicle 5 capture sensor information/data in accordance with the modified operation of one or more systems of the vehicle 5. For example, the vehicle apparatus 20 may cause one or more sensors 29 to capture sensor information/data in accordance with the modified operation of the one or more systems of the vehicle 5. For example, the vehicle apparatus 20 may comprise means, such as processor 22, memory 24, sensors 29, and/or the like, for capturing sensor information/data in accordance with the modified operation of the one or more systems of the vehicle 5. For example, one or more first sensors may capture sensor information/data in accordance with one or more modified capture frequencies. For example, one or more second sensors may capture sensor information/data in accordance with one or more modified capture thresholds. The sensor information/data may be stored in the memory 24, another computer-readable memory onboard the vehicle 5 (e.g., a black box), and/or provided (e.g., transmitted) such that it is received by the approval apparatus 10 and/or other computing apparatus for storage by a computer-readable memory that is remotely located with respect to the vehicle 5 (e.g., not onboard the vehicle 5). In an example embodiment, all of the sensor information/data captured by the one or more sensors 29 as the vehicle 5 traverses the human operator-free trip route is stored and/or provided for remote storage. For example, in an example embodiment, the vehicle apparatus 20 may periodically provide (e.g., transmit) sensor information/data captured as the vehicle 5 traverses the human operator-free trip route via communications interface 26. In an example embodiment, the sensor information/data captured as the vehicle 5 traverses the human operator-free trip route is save by memory 24 and, when the vehicle 5 reaches the destination location, the totality of the sensor information/data captured and/or saved during the traversal of the human operator-free trip route by the vehicle 5 is provided via the communications interface 26 for remote storage. In various embodiments, the rich sensor information/data captured and stored as the vehicle 5 takes a human operator-free trip (e.g., richer than the sensor information/data captured and stored as the vehicle 5 takes a normal mode (e.g., human passenger present) trip) may be used in to investigate any situation that may occur while the vehicle 5 is taking the human operator-free trip.

At block 512, the vehicle 5 reaches the destination location. For example, the vehicle apparatus 20 may control the vehicle 5 to park the vehicle 5 in a parking spot and/or waiting location at the destination location. For example, the vehicle apparatus 20 may comprise means, such as the processor 22, memory 24, sensors 29, and/or the like to park the vehicle 5 in a parking spot and/or waiting location at the destination location. In an example embodiment, when it is determined by the vehicle apparatus 20 (e.g., based on one or more location sensors of the one or more sensors 29) that the vehicle 5 has reached the destination location and the vehicle has been parked in the parking spot and/or waiting location, the operation of one or more systems of the vehicle may be modified, adjusted, and/or reverted to a normal stand-by and/or off mode settings. For example, the vehicle apparatus 20 may cause one or more systems of the vehicle 5 to be operated in a stand-by mode and/or off mode similar to the stand-by and/or off mode when a normal mode (e.g., human passenger present mode) trip is completed. Once the vehicle 5 is parked in the parking spot and/or waiting location at the destination location, the vehicle apparatus 20 and vehicle 5 wait until a human operator-free trip trigger is received and/or identified or for one or more authorized passengers to enter the vehicle.

In an example embodiment, if a vehicle 5 encounters a situation that would satisfy one or more rejection criteria (e.g., a traffic incident occurs along the human operator-free trip route while the vehicle 5 is traversing the human operator-free trip route), the vehicle apparatus 20 may initiate and/or identify a new human operator-free trip trigger such that a new human operator-free trip route may be determined to minimize the vehicle's 5 exposure to the situation that would satisfy the one or more rejection criteria.

Exemplary Operation of the Approval Apparatus

In various embodiments, an approval apparatus 10 is configured to receive trip requests comprising candidate routes for human operator-free trips, review and/or analyze each candidate route based on obstacle information/data spatially and/or temporally corresponding to the candidate route, and provide messages responding to the trip requests and indicating the approval or rejection of the corresponding candidate route. In an example embodiment, the approval apparatus 10 may further determine and provide, as part of the message, one or more route suggestions. For example, a route suggestion may comprise a revised candidate route, a revised candidate destination location, one or more road segments a human operator-free trip route should not include for the time frame corresponding to the trip request, one or more road segments that a human operator-free trip route may include for the time frame corresponding to the trip request, and/or the like. In various embodiments, the approval apparatus 10 may be a server or other computing entity operating a human operator-free trip approval program (e.g., executing program code corresponding to a human operator-free trip approval program) in an OLP environment. In various embodiments, the OLP environment is a platform through which real time and/or near real time, current, and/or historical location-based information/data may be accessed for use in various location-based services. For example, the obstacle information/data corresponding to a candidate route may be accessed via the OLP.

FIG. 6 provides a flowchart illustrating operations performed, such as by the approval apparatus of FIG. 2A, to approve a candidate trip, according to an example embodiment. Starting at block 602, a trip request is received. In various embodiments, the approval apparatus 10 receives a trip request provided by a vehicle apparatus 20. For example, the approval apparatus 10 may comprise means, such as the processor 12, memory 14, communications interface 16, and/or the like for receiving a trip request. In various embodiments, the trip request comprises a candidate route, a candidate destination location for the candidate route, the expected travel time for traversing the candidate route, information regarding the vehicle 5 (e.g., vehicle identifier, make, model, sensor arrangement, safety features, etc.), and/or the like. In an example embodiment, the trip request may comprise one or more passcodes, tokens, and/or the like for accessing a private vehicle storage area. As should be understood, the trip request received by the approval apparatus 10 may be a revised trip request.

At block 604, responsive to receiving the trip request, obstacle information/data corresponding to the candidate route is accessed. For example, the approval apparatus 10 may access obstacle information/data corresponding to the candidate route. For example, the approval apparatus 10 may comprise means, such as processor 12, memory 14, communications interface 16, and/or the like for accessing obstacle information/data. In various embodiments, the obstacle information/data comprises one or more of current (e.g., real time or near real time) traffic conditions, predicted traffic conditions for a time period corresponding to the candidate route, construction information/data, current (e.g., real time or near real time) pedestrian traffic information/data, expected pedestrian traffic information/data for a time period corresponding to the candidate route, points of interest (POI) information/data, map information/data regarding driving difficulty and/or maneuver difficulty corresponding to one or more road segments and/or intersections, and/or the like. In various embodiments, the obstacle information/data that corresponds to the candidate route is obstacle information/data that relates to one or more road segments of the candidate route in a time frame at which it is expected that the vehicle 5 would traverse the one or more road segments based on the candidate route and current traffic information/data. For example, if it is expected that, according to the candidate route and current traffic information/data, that the vehicle would traverse a first road segment fifteen minutes from now, the obstacle information/data corresponding to the trip request and/or candidate route may comprise obstacle information/data expected to be relevant to the first road segment fifteen minutes from now, 10-20 minutes from now, within the next half an hour, and/or the like. For example, obstacle information/data is accessed that corresponds to the candidate route in location and time. In various embodiments, obstacle information/data may be received from and/or determined based on a traffic control system, one or more probe apparatuses, and/or the like. In an example embodiment, the obstacle information/data corresponding to the trip request and/or candidate route may be accessed via the OLP.

At block 606, the candidate route may be review in light of the obstacle information/data corresponding to the trip request and/or candidate route. For example, the approval apparatus 10 may review the candidate route in light of the obstacle information/data corresponding to the trip request and/or candidate route. For example, the approval apparatus 10 may comprise means, such as processor 12, memory 14, and/or the like, for reviewing the candidate route in light of the obstacle information/data corresponding to the trip request and/or candidate route. For example, the candidate route and the obstacle information/data corresponding to the trip request and/or candidate route may be analyzed to determine whether one or more rejection criteria are satisfied by the candidate route and the obstacle information/data corresponding to the candidate route and/or trip request. For example, the rejection criteria may consider construction along the candidate route, events or points of interest along the candidate route that may cause increased pedestrian traffic, traffic incidents and/or traffic congestion along the candidate route, illumination levels along the route, weather along the route, traffic signals along the route, driving difficulty of one or more road segments and/or maneuvers along the route, vehicle information/data (e.g., safety features of the vehicle, sensor configuration of the vehicle, vehicle make and model, and/or the like). For example, the one or more rejection criteria may be configured to cause rejection of candidate routes having a driving difficulty score greater than a threshold difficulty score, wherein the driving difficulty score may be determined based on one or more of construction along the candidate route, events or points of interest along the candidate route that may cause increased pedestrian traffic, traffic incidents and/or traffic congestion along the candidate route, illumination levels along the route, weather along the route, traffic signals along the route, driving difficulty of one or more road segments and/or maneuvers along the route, vehicle information/data. For example, the one or more rejection criteria may be configured to cause rejection of a candidate route that includes a road segment along which there is construction, an event or POI expected to correspond to medium to high levels of pedestrian traffic, traffic congestion and/or a traffic incident, uneven and/or broken pavement (e.g., potholes, etc.), low visibility, sharp turns, steep inclines and/or declines, difficult maneuvers (e.g., taking a left turn across multiple lanes of traffic without a traffic signal), road segments known to experience large puddles or flooding (if the current, recent, and/or predicted weather is rainy), road segments known to experience significant icing (if the current, recent, and/or predicted weather is cold, snowy, sleety, and/or includes freezing rain), and/or the like. Thus, the one or more rejection criteria is configured to prevent the vehicle 5 from having to maneuver difficult driving situations while taking the human operator-free trip, situations where the vehicle 5 may need to maneuver in areas where there are pedestrians, and/or the like.

At block 608, it is determined whether the candidate route and the obstacle information/data corresponding to the trip request and/or candidate route satisfy one or more rejection criteria. For example, the approval apparatus 10 may determine whether the candidate route and the obstacle information/data corresponding to the trip request and/or candidate route satisfy one or more rejection criteria. For example, the approval apparatus 10 may comprise means for determining whether the candidate route and the obstacle information/data corresponding to the trip request and/or candidate route satisfy one or more rejection criteria.

Responsive to determining, at block 608, that the candidate route and the obstacle information/data corresponding to the trip request and/or candidate route do not satisfy any of the one or more rejection criteria, the candidate route is approved and a message indicating the that the candidate route is approved is generated and provided at block 610. For example, responsive to determining, by the approval apparatus 10, that the candidate route and the obstacle information/data corresponding to the trip request and/or candidate route do not satisfy any of the one or more rejection criteria, the approval apparatus 10 may generate and provide a communication indicating that the candidate route is approved. For example, the approval apparatus 10 may comprise means, such as the processor 12, memory 14, communications interface 16, and/or the like for generating and providing a communication indicating that the candidate route is approved. In various embodiments, the message is provided such that the vehicle apparatus 20 receives the message. In an example embodiment, the message comprises an indication that the candidate route is approved.

Responsive to determining, at block 608, that the candidate route and the obstacle information/data corresponding to the trip request and/or candidate route do satisfy one or more rejection criteria, the candidate route is rejected. At block 612, the approval apparatus 10 may determine and/or generate one or more route suggestions. In various embodiments, the route suggestions may comprise a revised candidate destination location, a revised route, one or more road segments that should be avoided, one or more road segments that are acceptable to be included in a route for a human operator-free trip, and/or the like. For example, the approval apparatus 10 may identify a revised candidate destination location that is closer to the origin location of the candidate route, for which there is a route between the origin location and the revised candidate destination location that does not satisfy any of the one or more rejection criteria, and/or the like. For example, the route suggestion may identify one or more road segments of the candidate route that satisfy one or more rejection criteria such that a revised candidate route may be determined that avoids the identified one or more road segments. For example, the route suggestion may indicate that a first road segment should be avoided and an approvable way to avoid the first road segment is to use a second and third road segments. In an example embodiment, the route suggestion comprises a revised candidate route that, at the time that the route suggestion is determined and/or generated, does not satisfy any of the one or more rejection criteria.

At block 614, a message is generated and provided. For example, the approval apparatus 10 may generate and provide a message indicating that the candidate route is rejected. For example, responsive to determining, by the approval apparatus 10, that the candidate route and the obstacle information/data corresponding to the trip request and/or candidate route satisfy one or more rejection criteria, the approval apparatus 10 may generate and provide a communication indicating that the candidate route is rejected. For example, the approval apparatus 10 may comprise means, such as the processor 12, memory 14, communications interface 16, and/or the like for generating and providing a communication indicating that the candidate route is rejected. In various embodiments, the message is provided such that the vehicle apparatus 20 receives the message. In an example embodiment, the message comprises an indication that the candidate route is rejected. In an example embodiment, the message further comprises one or more route suggestions.

Technical Advantages

Various embodiments of the present invention provide methods, apparatuses, systems, computer program products, and/or the like for an autonomous, self-driving vehicle to take a zero passenger (e.g., no human present) trip. To fully realize the potential of vehicles capable of level 4 and level 5 autonomous driving (as defined in the J3106 document by the Society of Automotive Engineers (SAE) International), the vehicle should be able to drop a user off or pick a user up at a user selected location, rather than the user having to travel to the parking lot or parking garage to retrieve the vehicle. However, for a vehicle to move itself from a parking lot or other vehicle storage area to a user selected pick up location (or from a user selected drop off area to a vehicle storage area) the vehicle must perform a human operator-free trip. Moreover, automated item pick-up and delivery systems would also benefit from being able to perform human operator-free trips.

However, human operator-free trips present technical problems. In particular, when taking a human operator-free trip, a vehicle would need to maneuver on its own and deal with any traffic, weather, construction, pedestrian, and/or other one-off situations the vehicle came across. Maneuvering through such one-off situations without human interaction increases the risk of accidents or inefficiencies for the vehicle's trip. Additionally, the security of the vehicle as the vehicle takes a human operator-free trip may be compromised.

Embodiments of the present invention provide technical solutions for addressing the increased risk of accidents or inefficiencies of a vehicle taking a human operator-free trip. For example, the route approval process described above (e.g., with respect to FIG. 3) prevents the vehicle taking a human operator-free trip from encountering difficult to navigate one-off situations and/or reduces the number of one-off situations a vehicle taking a human operator-free trip is likely to encounter. Thus, various embodiments of the present invention provide a solution for reducing the risk of accidents and/or inefficiencies when a vehicle is taking a human operator-free trip. Moreover, the approval apparatus may act in a manner similar to an air traffic control system for vehicles taking human operator-free trips such that vehicles taking human operator-free trips may be easily identified, tracked, and/or the like. In various embodiments, when the vehicle is taking a human operator-free trip, the vehicle is operated in zero passenger mode. When in zero passenger mode, one or more systems of the vehicle are operated in a mode differently than when the vehicle is operated in normal (human present) mode. This change in the operation of various vehicle systems when the vehicle is operated in zero passenger mode maintains the security of the vehicle as the vehicle is taking the human operator-free trip. For example, the vehicle cannot be car-jacked as the vehicle takes the zero passenger mode. Moreover, the richer sensor information/data collected when the vehicle is operated in zero passenger mode allows the vehicle apparatus to maneuver through various situations and allows any situation including the vehicle during the human operator-free trip to be thoroughly investigated. Moreover, the rich sensor information/data collected may be used to train future systems to prevent incidents in various situations (e.g., rare one-off situations). Therefore, various embodiments of the present invention provide technical improvements to autonomous driving technologies.

III. Example Apparatus

The approval apparatus 10, vehicle apparatus 20, user apparatus 30, and/or dispatch apparatus 40 of an example embodiment may be embodied by or associated with a variety of computing devices including, for example, a navigation system including an in-vehicle navigation system, a vehicle control system, a personal navigation device (PND) or a portable navigation device, an advanced driver assistance system (ADAS), a global navigation satellite system (GNSS), a cellular telephone, a mobile phone, a personal digital assistant (PDA), a watch, a camera, a computer, and/or other device that can perform navigation-related functions, such as digital routing and map display. Additionally or alternatively, the approval apparatus 10, vehicle apparatus 20, user apparatus 30, and/or dispatch apparatus 40 may be embodied in other types of computing devices, such as a server, a personal computer, a computer workstation, a laptop computer, a plurality of networked computing devices or the like. In an example embodiment, a vehicle apparatus 20 is an in-vehicle navigation system and/or vehicle control system onboard a vehicle 5, a user apparatus 30 is a mobile device such as a smart phone, an approval apparatus 10 is a server, and a dispatch apparatus 40 is a server. In this regard, FIG. 2A depicts an example approval apparatus 10, FIG. 2B depicts an example vehicle apparatus 20, and FIG. 2C depicts an example user apparatus 30 that may be embodied by various computing devices including those identified above.

As shown, the approval apparatus 10 of an example embodiment may include, may be associated with, or may otherwise be in communication with a processor 12 and a memory device 14 and optionally a communication interface 16 and/or a user interface 18. Similarly, the vehicle apparatus 20 may comprise a processor 22, memory 24, a communications interface 26, a user interface 28, one or more sensors 29 such as one or more location sensors (e.g., a GNSS sensor; IMU sensors; an odometry system, and/or the like) and/or other components configured to perform various operations, procedures, functions or the like described herein. For example, in an example embodiment, a vehicle apparatus 20 may comprise and/or be in communication with one or more sensors such as, for example, a camera(s); two dimensional (2D) and/or three dimensional (3D) light detection and ranging (LiDAR)(s); long, medium, and/or short range radio detection and ranging (RADAR); ultrasonic sensors; electromagnetic sensors; (near-) infrared (IR) cameras; 3D cameras; 360° cameras; fuel level sensors; vehicle system sensors (e.g., oil status sensors, tire pressure sensors, engine oil pressure sensors, coolant level sensors, engine/coolant temperature sensors, and/or other sensors that enable the vehicle apparatus 20 to determine one or more features of the corresponding vehicle's 5 surroundings and/or monitor the vehicle's 5 operating parameters). In various embodiments, the user apparatus 30 of an example embodiment may include, may be associated with, or may otherwise be in communication with a processor 32, a memory device 34, a communication interface 36, and/or a user interface 38. Similarly, in an example embodiment, a dispatch apparatus 40 may include, be associated with, or may otherwise be in communication with a processor, a memory device, a communication interface, and/or a user interface.

In some embodiments, the processor 12, 22, 32 (and/or co-processors or any other processing circuitry assisting or otherwise associated with the processor) may be in communication with the memory device 14, 24, 34 via a bus for passing information among components of the apparatus. The memory device may be non-transitory and may include, for example, one or more volatile and/or non-volatile memories. In other words, for example, the memory device may be an electronic storage device (e.g., a non-transitory computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the approval apparatus 10, vehicle apparatus 20, user apparatus 30, and/or dispatch apparatus 40 may be embodied by a computing device and/or computing entity. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 12, 22, 32 may be embodied in a number of different ways. For example, the processor 12, 22, 32 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 12, 22, 32 may include one or more processing cores configured to perform independently. A multi-core processor may enable multiprocessing within a single physical package. Additionally or alternatively, the processor 12, 22, 32 may include one or more processors configured in tandem via the bus to enable independent execution of instructions, pipelining and/or multithreading.

In an example embodiment, the processor 12, 22, 32 may be configured to execute instructions stored in the memory device 14, 24, 34 or otherwise accessible to the processor. Alternatively or additionally, the processor 12, 22, 32 may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the approval apparatus 10, vehicle apparatus 20, user apparatus 30, and/or dispatch apparatus 40 may include a user interface 18, 28, 38 that may, in turn, be in communication with the processor 12, 22, 32 to provide output to the user, such as one or more instances of map information/data and/or graphical presentations thereof, one or more routes through a road network (e.g., lane-level routes), and/or the output of one or more other navigation functions, and, in some embodiments, to receive an indication of a user input. As such, the user interface may include one or more output devices such as a display, speaker, and/or the like and, in some embodiments, may also include one or more input devices such as a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor 12, 22, 32 (e.g., memory device 14, 24, 34 and/or the like).

The approval apparatus 10, vehicle apparatus 20, user apparatus 30, dispatch apparatus 40 may further include a communication interface 16, 26, 36. The communication interface may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In addition to embodying the approval apparatus 10, vehicle apparatus 20, user apparatus 30, and/or dispatch apparatus 40 of an example embodiment, a navigation system may also include or have access to a geographic database that includes a variety of data (e.g., map information/data) utilized in constructing a route or navigation path (e.g., a lane-level route), determining the time to traverse the route or navigation path, matching a geolocation (e.g., a GNSS determined location) to a point on a map, a lane of a lane network, and/or link, one or more localization features and a corresponding location of each localization feature, and/or the like. For example, a geographic database may include road segment or link data records, point of interest (POI) data records, localization feature data records, and other data records. More, fewer, or different data records can be provided. In one embodiment, the other data records include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GNSS data associations (such as using known or future map matching or geo-coding techniques), for example. In an example embodiment, the data records may comprise nodes, connection information/data, intersection data records, link data records, travel lane data records, POI data records, and/or other data records. In an example embodiment, the approval apparatus 10 may be configured to modify, update, and/or the like one or more data records of the geographic database. For example, the approval apparatus 10 may modify, update, generate, and/or the like map information/data corresponding to links, lanes of a road segments, nodes, intersection, POIs, and/or the like and/or the corresponding data records, a localization layer (e.g., comprising localization features) and/or the corresponding data records, and/or the like. In an example embodiment, the approval apparatus 10 may configured to access location-based and/or time-dependent obstacle information/data from an OLP environment.

In an example embodiment, the road segment data records are links or segments, e.g., maneuvers of a maneuver graph, representing roads, streets, travel lanes of roads and/or streets, or paths, as can be used in the calculated route or recorded route information for determination of one or more personalized routes (e.g., lane-level routes). The intersection data records are end points corresponding to the respective links or segments of the road segment data records. The road link data records and the intersection data records represent a road network, such as used by vehicles, cars, and/or other entities. Alternatively, the geographic database can contain path segment and intersection data records or nodes and connection information/data or other data that represent pedestrian paths or areas in addition to or instead of the vehicle road record data, for example.

The road/link segments, travel lanes, intersections, and/or nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database can include information/data about the POIs and their respective locations in the POI data records. The geographic database can also include data about places, such as cities, towns, or other communities, and other geographic features, such as bodies of water, mountain ranges, etc. Such place or feature data can be part of the POI information/data or can be associated with POIs or POI data records (such as a data point used for displaying or representing a position of a city). In addition, the geographic database can include and/or be associated with event data (e.g., traffic incidents, constructions, scheduled events, unscheduled events, etc.) associated with the POI data records, or other records of the geographic database.

The geographic database can be maintained by the content provider (e.g., a map developer) in association with the services platform. By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used. In an example embodiment, the geographic database may be generated and/or updated based on map information/data generated and/or extracted from sensor information/data provided by vehicle apparatuses 20 through the use of update and/or notification messages. In various embodiments, the vehicle apparatuses 20 may be onboard vehicles owned and/or operated by and/or on behalf of members of the general public or onboard vehicles owned and/or operated as part of a private fleet.

The geographic database can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions. The navigation-related functions can correspond to vehicle navigation or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases. Regardless of the manner in which the databases are compiled and maintained, a navigation system that embodies an approval apparatus 10 and/or vehicle apparatus 20 in accordance with an example embodiment may determine the time to traverse a route that includes one or more turns at respective intersections more accurately.

IV. Apparatus, Methods, and Computer Program Products

As described above, FIGS. 3, 5, and 6 illustrate flowcharts of an approval apparatus 10 and/or vehicle apparatus 20, methods, and computer program products according to an example embodiment of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 14, 24, 34 of an apparatus employing an embodiment of the present invention and executed by the processor 12, 22, 32 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, simplifications, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   identifying a human operator-free trip trigger by a vehicle apparatus onboard a vehicle, the vehicle located at an origin location, wherein the human operator-free trip trigger indicates zero passengers inside the vehicle;
   responsive to identifying the human operator-free trip trigger, identifying a candidate destination location for a human operator-free trip;
   generating a candidate route from the origin location to the candidate destination location;

providing, by the vehicle apparatus, a trip request comprising the candidate route to an approval apparatus, based on identifying the human operator-free trip trigger, wherein the approval apparatus reviews the candidate route based on obstacle information and one or more rejection criteria;

receiving, by the vehicle apparatus, a message from the approval apparatus; and responsive to determining that the message comprises an approval of the candidate route, controlling, by the vehicle apparatus, one or more systems of the vehicle to cause the vehicle to traverse the candidate route from the origin location to the candidate destination location.

2. The method of claim 1, further comprising, responsive to determining that the message comprises a rejection of the candidate route, determining a revised candidate route and providing a revised trip request to the approval apparatus.

3. The method of claim 2, wherein the revised candidate route is from the origin location to a revised candidate destination location.

4. The method of claim 2, wherein the message comprises one or more route suggestions and the revised candidate route is determined at least in part based on at least one of the one or more route suggestions.

5. The method of claim 2, wherein (a) the vehicle apparatus does not begin the human operator-free trip until the vehicle apparatus determines that a message indicating approval of a candidate route or revised candidate route is received and (b) the vehicle apparatus controls the vehicle to take the human operator-free trip along the approved candidate route or revised candidate route.

6. The method of claim 1, further comprising modifying the operation of one or more sensors onboard the vehicle wherein the modified operation of the one or more sensors (a) causes one or more first sensors of the one or more sensors to increase the frequency of data capture, (b) changes at least one capture threshold for at least one second sensor of the one or more sensors, or (c) a combination of causing the one or more first sensors to increase the frequency of data capture and changing at least one capture threshold for at least one second sensor.

7. The method of claim 6, wherein the sensor data captured by the one or more sensors is at least one of (a) stored in computer-readable memory onboard the vehicle or (b) provided to a remote computing apparatus for storage.

8. The method of claim 1, wherein the vehicle apparatus controls the vehicle in a no human override mode as the vehicle traverses the route from the origin location to the candidate destination.

9. The method of claim 1, wherein the candidate destination location is one of a pre-defined vehicle storage area, a passenger pick-up location, or a location indicated in the human operator-free trip trigger.

10. A system comprising one or more sensors; at least one communication interface configured to communicate via at least one network; an approval apparatus; a vehicle apparatus; and a server connectively coupled with the vehicle apparatus, wherein the server comprises at least one processor and at least one non-transitory memory storing computer program code-and wherein the processor is configured to execute the computer program code to at least:

identify a human operator-free trip trigger, the vehicle located at an origin location, wherein the human operator-free trip trigger indicates zero passengers inside the vehicle;

responsive to identifying the human operator-free trip trigger, identify a candidate destination location for a human operator-free trip;

generate a candidate route from the origin location to the candidate destination location;

provide a trip request comprising the candidate route to the approval apparatus, based on identifying the human operator-free trip trigger, wherein the approval apparatus reviews the candidate route based on obstacle information and one or more rejection criteria;

receive a message from the approval apparatus; and responsive to determining that the message comprises an approval of the candidate route, controlling one or more systems of the vehicle to cause the vehicle to traverse the candidate route from the origin location to the candidate destination location.

11. The apparatus of claim 10, wherein the computer program code is further configured to, when executed by the at least one processor, cause the apparatus to, responsive to determining that the message comprises a rejection of the candidate route, determine a revised candidate route and provide a revised trip request to the approval apparatus.

12. The apparatus of claim 11, wherein the revised candidate route is from the origin location to a revised candidate destination location.

13. The apparatus of claim 11, wherein the message comprises one or more route suggestions and the revised candidate route is determined at least in part based on at least one of the one or more route suggestions.

14. The apparatus of claim 11, wherein (a) the apparatus does not begin the human operator-free trip until the apparatus determines that a message indicating approval of a candidate route or revised candidate route is received and (b) the apparatus controls the vehicle to take the human operator-free trip along the approved candidate route or revised candidate route.

15. The apparatus of claim 10, wherein the computer program code is further configured to, when executed by the at least one processor, cause the apparatus to modify the operation of one or more sensors onboard the vehicle wherein the modified operation of the one or more sensors (a) causes one or more first sensors of the one or more sensors to increase the frequency of data capture, (b) changes at least one capture threshold for at least one second sensor of the one or more sensors, or (c) a combination of causing the one or more first sensors to increase the frequency of data capture and changing at least one capture threshold for at least one second sensor.

16. The apparatus of claim 15, wherein the sensor data captured by the one or more sensors is at least one of (a) stored in computer-readable memory onboard the vehicle or (b) provided to a remote computing apparatus for storage.

17. The apparatus of claim 10, wherein the apparatus controls the vehicle in a no human override mode as the vehicle traverses the route from the origin location to the candidate destination.

18. The apparatus of claim 10, wherein the candidate destination location is one of a pre-defined vehicle storage area, a passenger pick-up location, or a location indicated in the human operator-free trip trigger.

19. A method comprising:

modifying operation of one or more sensors onboard of a vehicle, by a vehicle apparatus, when the vehicle apparatus is going to control the vehicle to take a human operator-free trip from an origin location to a destination location, wherein the human operator-free trip trigger indicates zero passengers inside the vehicle;

controlling the vehicle, by the vehicle apparatus, along a route from the origin location to the destination and capturing sensor data from the one or more sensors onboard the vehicle in accordance with the modified operation of the one or more sensors; and at least one of storing or providing the captured sensor data, wherein the modified operation of the one or more sensors (a) causes one or more first sensors of the one or more sensors to increase the frequency of data capture, (b) changes at least one capture threshold for at least one second sensor of the one or more sensors, or (c) a combination of causing the one or more first sensors to increase the frequency of data capture and changing at least one capture threshold for at least one second sensor.

20. The method of claim 19, further comprising modifying the responsiveness of one or more human interaction systems of the vehicle.

* * * * *